United States Patent
Davidson

(10) Patent No.: US 8,185,229 B2
(45) Date of Patent: *May 22, 2012

(54) APPARATUS AND METHODS FOR HANDLING MATERIALS IN A 3-D PRINTER

(75) Inventor: Thomas Davidson, Arlington, MA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,668

(22) Filed: Jun. 7, 2011

(65) Prior Publication Data

US 2011/0233808 A1 Sep. 29, 2011

Related U.S. Application Data

(62) Division of application No. 11/807,175, filed on May 25, 2007, now Pat. No. 7,979,152.

(60) Provisional application No. 60/808,721, filed on May 26, 2006.

(51) Int. Cl.
*B29C 67/02* (2006.01)

(52) U.S. Cl. .............. 700/118; 700/119; 141/8; 141/98; 264/113; 264/497; 151/284

(58) Field of Classification Search ............... 141/8, 65, 141/73, 98; 264/101, 112, 113, 497; 156/284; 700/118–119
See application file for complete search history.

(56) References Cited

U.S. PATENT DOCUMENTS

| | | |
|---|---|---|
| 4,247,508 A | 1/1981 | Housholder |
| 4,250,513 A | 2/1981 | Harlow et al. |
| 4,416,603 A | 11/1983 | Peltsman et al. |
| 4,575,330 A | 3/1986 | Hull |
| 4,618,276 A | 10/1986 | Blomquist et al. |
| 4,752,352 A | 6/1988 | Feygin |
| 4,853,717 A | 8/1989 | Harmon et al. |
| 4,863,538 A | 9/1989 | Deckard |
| 4,872,026 A | 10/1989 | Rasmussen et al. |
| 4,929,402 A | 5/1990 | Hull |
| 4,938,816 A | 7/1990 | Beaman et al. |
| 4,944,817 A | 7/1990 | Bourell et al. |
| 4,996,010 A | 2/1991 | Modrek |
| 5,014,074 A | 5/1991 | Dody et al. |
| 5,015,312 A | 5/1991 | Kinzie |

(Continued)

FOREIGN PATENT DOCUMENTS

DE 3713794 A1 11/1988

(Continued)

OTHER PUBLICATIONS

DTM Corporation, "The Sinterstation™ 2000 System Selective Laser Sintering Users Guide," (DTM Corporation, Nov. 1993).

(Continued)

*Primary Examiner* — Gregory Huson
*Assistant Examiner* — Nicolas A Arnett

(57) ABSTRACT

A method of controlling the flow of unbound powder in a build chamber. A build surface for receiving the powder is provided, with the build surface including a first plate defining holes and a second plate defining a plurality of openings spaced apart and offset from the plurality of holes in the first plate. The second plate is disposed below and spaced from the first plate. A vacuum source is provided below the build surface.

13 Claims, 20 Drawing Sheets

U.S. PATENT DOCUMENTS

| | | |
|---|---|---|
| 5,017,753 A | 5/1991 | Deckard |
| 5,027,134 A | 6/1991 | Harmon et al. |
| 5,053,090 A | 10/1991 | Beaman et al. |
| 5,076,869 A | 12/1991 | Bourell et al. |
| 5,088,047 A | 2/1992 | Bynum |
| 5,103,244 A | 4/1992 | Gast et al. |
| 5,115,250 A | 5/1992 | Harmon et al. |
| 5,132,143 A | 7/1992 | Deckard |
| 5,134,569 A | 7/1992 | Masters |
| 5,137,662 A | 8/1992 | Hull et al. |
| 5,146,243 A | 9/1992 | English et al. |
| 5,147,587 A | 9/1992 | Marcus et al. |
| 5,155,324 A | 10/1992 | Deckard et al. |
| 5,174,943 A | 12/1992 | Hull |
| 5,184,307 A | 2/1993 | Hull et al. |
| 5,204,055 A | 4/1993 | Sachs et al. |
| 5,216,449 A | 6/1993 | English |
| 5,238,614 A | 8/1993 | Uchinono et al. |
| 5,252,264 A | 10/1993 | Forderhase et al. |
| 5,260,099 A | 11/1993 | Haskell |
| 5,263,130 A | 11/1993 | Pomerantz et al. |
| 5,273,691 A | 12/1993 | Hull et al. |
| 5,283,173 A | 2/1994 | Fields et al. |
| 5,296,062 A | 3/1994 | Bourell et al. |
| 5,301,863 A | 4/1994 | Prinz et al. |
| 5,316,580 A | 5/1994 | Deckard |
| 5,340,656 A | 8/1994 | Sachs et al. |
| 5,342,919 A | 8/1994 | Dickens, Jr. et al. |
| 5,344,298 A | 9/1994 | Hull |
| 5,345,391 A | 9/1994 | Hull et al. |
| 5,352,405 A | 10/1994 | Beaman et al. |
| 5,382,308 A | 1/1995 | Bourell et al. |
| 5,387,380 A | 2/1995 | Cima et al. |
| 5,393,613 A | 2/1995 | MacKay |
| 5,430,666 A | 7/1995 | DeAngelis et al. |
| 5,433,280 A | 7/1995 | Smith |
| 5,448,270 A | 9/1995 | Osborne |
| 5,450,105 A | 9/1995 | Dangelo |
| 5,451,990 A | 9/1995 | Sorenson et al. |
| 5,460,758 A | 10/1995 | Langer et al. |
| 5,490,882 A | 2/1996 | Sachs et al. |
| 5,490,962 A | 2/1996 | Cima et al. |
| 5,501,824 A | 3/1996 | Almquist et al. |
| 5,518,680 A | 5/1996 | Cima et al. |
| 5,527,877 A | 6/1996 | Dickens, Jr. et al. |
| 5,534,896 A | 7/1996 | Osborne |
| 5,547,438 A | 8/1996 | Nozaki et al. |
| 5,552,593 A | 9/1996 | Biss |
| 5,554,336 A | 9/1996 | Hull |
| 5,555,481 A | 9/1996 | Rock et al. |
| 5,556,590 A | 9/1996 | Hull |
| 5,559,538 A | 9/1996 | Nguyen et al. |
| 5,561,449 A | 10/1996 | Raskin et al. |
| 5,569,431 A | 10/1996 | Hull |
| 5,571,471 A | 11/1996 | Hull |
| 5,573,722 A | 11/1996 | Hull |
| 5,587,729 A | 12/1996 | Lee et al. |
| 5,597,589 A | 1/1997 | Deckard |
| 5,600,350 A | 2/1997 | Cobbs et al. |
| 5,616,099 A | 4/1997 | Sakai |
| 5,616,100 A | 4/1997 | Sakai et al. |
| 5,616,294 A | 4/1997 | Deckard |
| 5,622,577 A | 4/1997 | O'Connor |
| 5,630,981 A | 5/1997 | Hull |
| 5,637,175 A | 6/1997 | Feygin et al. |
| 5,639,070 A | 6/1997 | Deckard |
| 5,640,183 A | 6/1997 | Hackleman |
| 5,640,667 A | 6/1997 | Freitag et al. |
| 5,648,450 A | 7/1997 | Dickens, Jr. et al. |
| 5,653,925 A | 8/1997 | Batchelder |
| 5,663,751 A | 9/1997 | Holbrook |
| 5,682,186 A | 10/1997 | Bohorquez et al. |
| 5,685,800 A | 11/1997 | Toukura |
| 5,712,668 A | 1/1998 | Osborne et al. |
| 5,733,497 A | 3/1998 | McAlea et al. |
| 5,738,817 A | 4/1998 | Danforth et al. |
| 5,745,133 A | 4/1998 | Hendricks et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,757,395 A | 5/1998 | Chew et al. |
| 5,773,225 A | 6/1998 | Luban et al. |
| 5,776,409 A | 7/1998 | Almquist et al. |
| 5,788,916 A | 8/1998 | Caldarise |
| 5,796,414 A | 8/1998 | Sievert et al. |
| 5,812,157 A | 9/1998 | Nguyen et al. |
| 5,837,960 A | 11/1998 | Lewis et al. |
| 5,847,722 A | 12/1998 | Hackleman |
| 5,867,184 A | 2/1999 | Quintana |
| 5,876,550 A | 3/1999 | Feygin et al. |
| 5,902,441 A | 5/1999 | Bredt et al. |
| 5,917,516 A | 6/1999 | Nguyen et al. |
| 5,923,347 A | 7/1999 | Wade |
| 5,935,043 A | 8/1999 | Watanabe et al. |
| 5,943,122 A | 8/1999 | Holmes |
| 5,956,053 A | 9/1999 | Michael |
| 5,976,339 A | 11/1999 | Andre, Sr. |
| 6,000,779 A | 12/1999 | Ng et al. |
| 6,007,318 A | 12/1999 | Russell et al. |
| 6,027,209 A | 2/2000 | Menendez et al. |
| 6,059,893 A | 5/2000 | Kawasaki |
| 6,084,980 A | 7/2000 | Nguyen et al. |
| 6,098,538 A | 8/2000 | Hamu |
| 6,112,109 A | 8/2000 | D'Urso et al. |
| 6,116,719 A | 9/2000 | Maza et al. |
| 6,135,585 A | 10/2000 | Johnson et al. |
| 6,136,257 A | 10/2000 | Graf et al. |
| 6,154,230 A | 11/2000 | Holstun et al. |
| 6,158,849 A | 12/2000 | Veciana et al. |
| 6,164,753 A | 12/2000 | Maza et al. |
| 6,193,353 B1 | 2/2001 | Vives et al. |
| 6,196,652 B1 | 3/2001 | Subirada et al. |
| 6,199,973 B1 | 3/2001 | Bartolome et al. |
| 6,220,689 B1 | 4/2001 | Sturgeon |
| 6,234,602 B1 | 5/2001 | Soto et al. |
| 6,241,334 B1 | 6/2001 | Haselby |
| 6,241,337 B1 | 6/2001 | Sharma et al. |
| 6,250,736 B1 | 6/2001 | Wojcik |
| 6,257,143 B1 | 7/2001 | Iwasaki et al. |
| 6,270,183 B1 | 8/2001 | Gaarder |
| 6,270,204 B1 | 8/2001 | Barrett et al. |
| 6,280,014 B1 | 8/2001 | Sharma et al. |
| 6,281,908 B1 | 8/2001 | Gibson et al. |
| 6,283,574 B1 | 9/2001 | Sugimoto et al. |
| 6,286,929 B1 | 9/2001 | Sharma et al. |
| 6,290,323 B1 | 9/2001 | Sharma et al. |
| 6,309,044 B1 | 10/2001 | Gaarder |
| 6,312,090 B1 | 11/2001 | Griffin et al. |
| 6,325,480 B1 | 12/2001 | Moghadam et al. |
| 6,325,505 B1 | 12/2001 | Walker |
| 6,331,038 B1 | 12/2001 | Boleda et al. |
| 6,345,223 B1 | 2/2002 | Takizawa et al. |
| 6,347,858 B1 | 2/2002 | Faisst, Jr. et al. |
| 6,350,007 B1 | 2/2002 | Meichle et al. |
| 6,367,903 B1 | 4/2002 | Gast et al. |
| 6,375,847 B1 | 4/2002 | Hartmann et al. |
| 6,375,874 B1 | 4/2002 | Russell et al. |
| 6,386,678 B1 | 5/2002 | Michael et al. |
| 6,390,588 B1 | 5/2002 | Ikeda et al. |
| 6,390,593 B1 | 5/2002 | DeRoos et al. |
| 6,401,001 B1 | 6/2002 | Jang et al. |
| 6,402,288 B2 | 6/2002 | Rhodes et al. |
| 6,409,297 B1 | 6/2002 | Morgan et al. |
| 6,416,850 B1 | 7/2002 | Bredt et al. |
| 6,457,806 B2 | 10/2002 | Hickman |
| 6,467,867 B1 | 10/2002 | Worthington et al. |
| 6,497,472 B2 | 12/2002 | Sharma et al. |
| 6,533,388 B2 | 3/2003 | Toh et al. |
| 6,535,293 B1 | 3/2003 | Mitsuhashi et al. |
| 6,540,323 B1 | 4/2003 | Dowell et al. |
| 6,547,360 B2 | 4/2003 | Takahashi et al. |
| 6,550,891 B1 | 4/2003 | Berg |
| 6,554,390 B2 | 4/2003 | Arquilevich et al. |
| 6,556,315 B1 | 4/2003 | Kommrusch et al. |
| 6,582,052 B2 | 6/2003 | Sarmast et al. |
| 6,604,812 B2 | 8/2003 | Askeland et al. |
| 6,609,779 B2 | 8/2003 | Davis et al. |

| | | |
|---|---|---|
| 6,612,824 B2 | 9/2003 | Tochimoto et al. |
| 6,623,098 B2 | 9/2003 | Davis |
| 6,626,101 B2 | 9/2003 | Kajiwara et al. |
| 6,658,314 B1 | 12/2003 | Gothait et al. |
| 6,665,432 B1 | 12/2003 | Evans et al. |
| 6,694,064 B1 | 2/2004 | Benkelman |
| 6,755,499 B2 | 6/2004 | Castano et al. |
| 6,771,837 B1 | 8/2004 | Berbecel et al. |
| 6,829,456 B2 | 12/2004 | Regimbal et al. |
| 6,832,824 B1 | 12/2004 | Baker et al. |
| 6,834,930 B2 | 12/2004 | Steinfield et al. |
| 6,838,035 B1 | 1/2005 | Ederer et al. |
| 6,841,166 B1 | 1/2005 | Zhang et al. |
| 6,860,585 B2 | 3/2005 | Serra et al. |
| 6,898,477 B2 | 5/2005 | Loughran |
| 6,918,648 B2 | 7/2005 | Tee et al. |
| 6,932,935 B1 | 8/2005 | Oberhofer et al. |
| 6,989,115 B2 | 1/2006 | Russell et al. |
| 7,004,222 B2 | 2/2006 | Ederer et al. |
| 7,027,887 B2 | 4/2006 | Gaylo et al. |
| 7,073,442 B2 | 7/2006 | Fedor et al. |
| 7,137,431 B2 | 11/2006 | Ederer et al. |
| 7,195,475 B2 | 3/2007 | Silverbrook |
| 7,216,009 B2 | 5/2007 | Farnworth et al. |
| 7,220,112 B2 | 5/2007 | Silverbrook |
| 7,220,115 B2 | 5/2007 | Silverbrook |
| 7,225,045 B2 | 5/2007 | Gothait et al. |
| 7,249,942 B2 | 7/2007 | Silverbrook |
| 7,261,542 B2 | 8/2007 | Hickerson et al. |
| 7,291,002 B2 | 11/2007 | Russell et al. |
| 7,364,686 B2 | 4/2008 | Kritchman et al. |
| 7,369,915 B2 | 5/2008 | Kritchman et al. |
| 7,373,214 B2 | 5/2008 | Silverbrook |
| 7,541,763 B2 | 6/2009 | Aono et al. |
| 7,550,518 B2 | 6/2009 | Bredt et al. |
| 7,725,209 B2 | 5/2010 | Menchik et al. |
| 7,824,001 B2 | 11/2010 | Fienup et al. |
| 7,828,022 B2 | 11/2010 | Davidson et al. |
| 7,979,152 B2 * | 7/2011 | Davidson ............... 700/118 |
| 2001/0000434 A1 | 4/2001 | Medin |
| 2001/0010526 A1 | 8/2001 | Barinaga |
| 2001/0045678 A1 | 11/2001 | Kubo et al. |
| 2001/0050031 A1 | 12/2001 | Bredt et al. |
| 2002/0012202 A1 | 1/2002 | Hagen |
| 2002/0047229 A1 | 4/2002 | Yanagisawa et al. |
| 2002/0075349 A1 | 6/2002 | Sawicki |
| 2002/0079601 A1 | 6/2002 | Russell et al. |
| 2002/0089561 A1 | 7/2002 | Weitzel et al. |
| 2002/0090410 A1 | 7/2002 | Tochimoto et al. |
| 2002/0122102 A1 | 9/2002 | Jeanmaire et al. |
| 2002/0126171 A1 | 9/2002 | Subirada et al. |
| 2002/0167101 A1 | 11/2002 | Tochimoto et al. |
| 2002/0171705 A1 | 11/2002 | Rhoads et al. |
| 2002/0186271 A1 | 12/2002 | Yamada et al. |
| 2003/0004599 A1 | 1/2003 | Herbak |
| 2003/0058301 A1 | 3/2003 | Sekiya |
| 2003/0081047 A1 | 5/2003 | Yearout |
| 2003/0197750 A1 | 10/2003 | Iwatsuki et al. |
| 2004/0012112 A1 | 1/2004 | Davidson et al. |
| 2004/0026803 A1 | 2/2004 | Yatsuda et al. |
| 2004/0056378 A1 | 3/2004 | Bredt et al. |
| 2004/0084814 A1 | 5/2004 | Boyd et al. |
| 2004/0153193 A1 | 8/2004 | Farnworth |
| 2004/0164436 A1 | 8/2004 | Khoshnevis |
| 2004/0182510 A1 | 9/2004 | Pfeifer et al. |
| 2004/0196333 A1 | 10/2004 | Yoshiyama et al. |
| 2004/0207123 A1 | 10/2004 | Patel et al. |
| 2004/0224173 A1 | 11/2004 | Boyd et al. |
| 2004/0232583 A1 | 11/2004 | Monsheimer et al. |
| 2004/0239009 A1 | 12/2004 | Collins et al. |
| 2004/0251574 A1 | 12/2004 | Collins et al. |
| 2004/0262803 A1 | 12/2004 | Neilsen et al. |
| 2004/0265413 A1 | 12/2004 | Russell et al. |
| 2005/0017394 A1 | 1/2005 | Hochsmann et al. |
| 2005/0072113 A1 | 4/2005 | Collins et al. |
| 2005/0179722 A1 | 8/2005 | Silverbrook |
| 2005/0179733 A1 | 8/2005 | Silverbrook |
| 2005/0189442 A1 | 9/2005 | Hussaini et al. |
| 2005/0200668 A1 | 9/2005 | Ieh |
| 2005/0280185 A1 | 12/2005 | Russell et al. |
| 2006/0061318 A1 | 3/2006 | Aono et al. |
| 2006/0061613 A1 | 3/2006 | Fienup et al. |
| 2006/0192322 A1 | 8/2006 | Abe et al. |
| 2007/0057412 A1 | 3/2007 | Weiskopf et al. |
| 2008/0006334 A1 | 1/2008 | Davidson et al. |
| 2008/0006958 A1 | 1/2008 | Davidson |
| 2008/0047628 A1 | 2/2008 | Davidson et al. |

FOREIGN PATENT DOCUMENTS

| | | |
|---|---|---|
| DE | 4417083 A1 | 11/1995 |
| DE | 299 07 262 | 8/1999 |
| EP | 0 289 116 A2 | 11/1988 |
| EP | 0 426 363 A2 | 5/1991 |
| EP | 0 431 924 | 6/1991 |
| EP | 0 622 239 A2 | 11/1994 |
| EP | 0 978 390 A2 | 11/1994 |
| EP | 0 694 396 A2 | 1/1996 |
| EP | 0 949 993 A2 | 10/1999 |
| EP | 1 034 936 A2 | 9/2000 |
| EP | 1 074 389 | 2/2001 |
| EP | 1 164 020 | 12/2001 |
| EP | 1 308 279 A2 | 5/2003 |
| EP | 1 310 369 | 5/2003 |
| EP | 1 558 440 A2 | 8/2005 |
| JP | 5-318607 A | 12/1993 |
| WO | WO-90/03893 A1 | 4/1990 |
| WO | WO-91/12120 A1 | 8/1991 |
| WO | WO-92/08592 A1 | 5/1992 |
| WO | WO-93/08928 A1 | 5/1993 |
| WO | WO-93/08929 | 5/1993 |
| WO | WO-94/02895 | 2/1994 |
| WO | WO-94/19112 A2 | 9/1994 |
| WO | WO-94/26446 A1 | 11/1994 |
| WO | WO-95/30503 A1 | 11/1995 |
| WO | WO-95/34468 A1 | 12/1995 |
| WO | WO-98/51477 A1 | 11/1998 |
| WO | WO-0068016 | 11/2000 |
| WO | WO-0175466 | 10/2001 |
| WO | WO-02/28565 A1 | 4/2002 |
| WO | WO-02-064354 | 8/2002 |
| WO | WO-03026876 | 4/2003 |
| WO | WO-2004024447 A2 | 3/2004 |
| WO | WO-2004/076102 A1 | 9/2004 |
| WO | WO-2005113219 A1 | 12/2005 |

OTHER PUBLICATIONS

Dubbel "Taschenbucnh Fur Den Maschinenbau," W. Beitz and K.H. Kuttner.

Evil Mad Scientist Laboratories, "Solid Freeform Fabrication: DIY, on the cheap, and made of pure sugar," (http://ww.evilmadscientist.com/article.php/candyfab, dated May 11, 2007, 17 pages.

International Search Report & Written Opinion in PCT/US2007/012494, mailed Mar. 26, 2008, 16 pages.

Invitation to Pay Additional Fees with Partial International Search Report for International application PCT/US2007/012494, mailed from the International Search Authority on Jan. 17, 2008, 6 pgs.

Office Action, European Patent Application No. 07809187.3-1253, Feb. 3, 2010, 6 pages.

Office Action, European Patent Application No. 07809187.3-1253, Sep. 17, 2010, 4 pages.

Office Action. Chinese Patent Application No. 200780026585.2, Dec. 27, 2010, 10 pages.

Rynerson, Michael L., Evaluation of the Advanced Ceramics Marker for New Applications of Three Dimensional Printing, May 1995, 169 pages, MIT-Theses 1995-366.

Sanders Prototype, Inc., Model-Maker Desktop 3D Modeling System (htt://www.sanders-prototype.com/datash.htm) (consisting of 4 pages).

Sanders Prototype, Inc., Modelmaker II System, The high precision 3D modeling system (http://www.sanders-prototype.com/mmii/mmii.htm) (consisting of 8 pages).

Sanders Prototype, Inc., Sanders Prototype "MM-6PRO" System (http://www.sanders-prototype.com/mm6pro.htm) (consisting of 4 pages).

Sanders Prototype, Inc., Sanders Prototype Incorporated Application Notes, (http:www.sanders-prototype.com/appnotes.htm) (consisting of 2 pages).

Sanders Prototype, Inc., SPI Model Maker.TM.3D Modeling System Technical Description (http://www.sanders-prototype.com/techdesc.htm.) (consisting of 3 pages).

Technology International Incorporated of Virginia, SBIR 95-1 Solicitation Project Summary (http:/sbir/gsfc.gov/95abstracts/08.07/951020.html) (consisting of 1 page).

The University of Texas, "Solid Freeform Fabrication Proceedings" Harris L. Marcus, et al., pp. 51-58, (Sep. 1993).

The University of Texas, "Solid Freeform Fabrication Proceedings," Harries L. Marcus, et al., pp. 94-101 (Sep. 1993).

Wu, Benjamin M., et al., "Solid Free-Form Frabrication of Drug Delivery Devices," journal of Controlled Released 40 (1996) pp. 77-87.

Z™ 406 3D Color Printer User Manual, Apr. 2002, 49 pages.

* cited by examiner

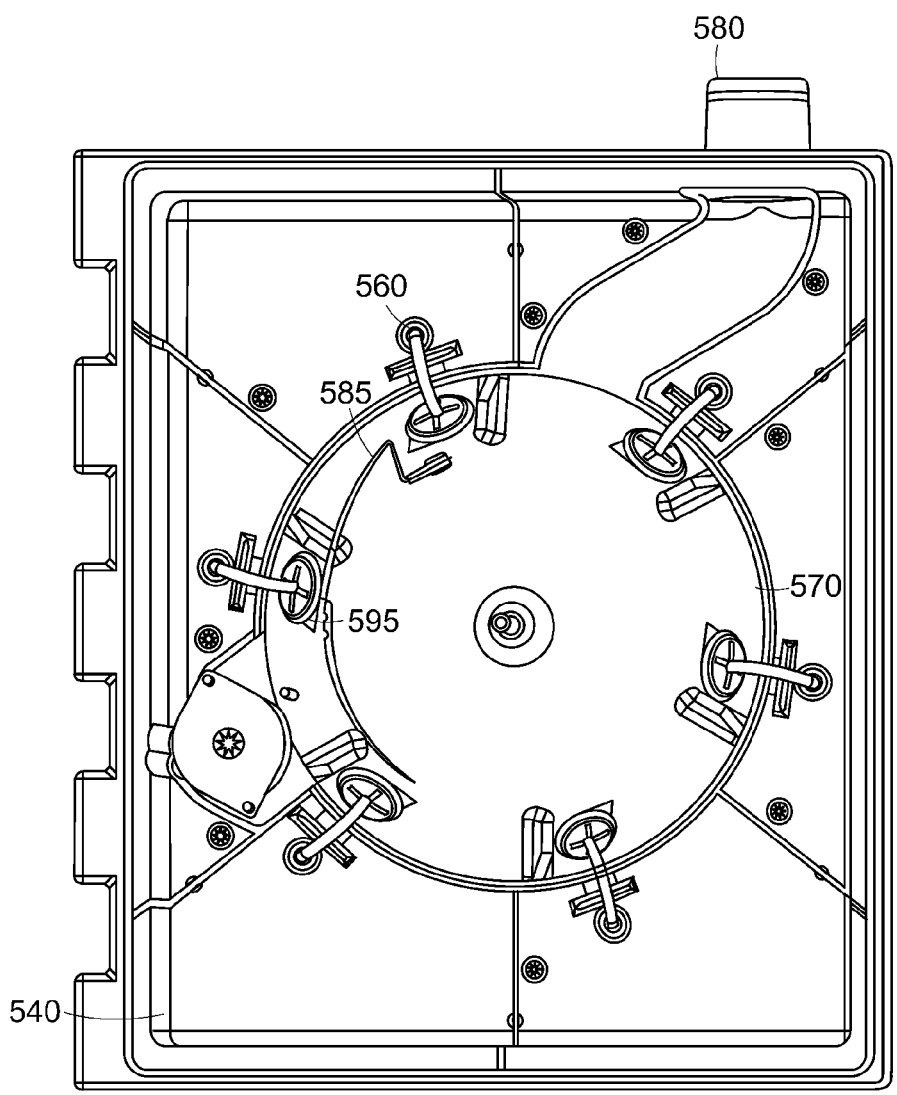
FIG. 5E
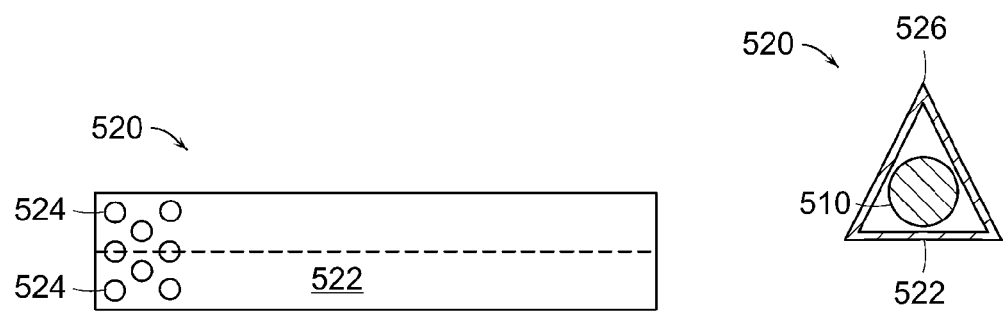
FIG. 5F
FIG. 5G

APPARATUS AND METHODS FOR HANDLING MATERIALS IN A 3-D PRINTER

CROSS-REFERENCE TO RELATED APPLICATIONS

This application is a divisional of U.S. patent application Ser. No. 11/807,175, filed on May 25, 2007, which claims the benefit of and priority to U.S. Provisional Patent Application Ser. No. 60/808,721, filed on May 26, 2006; the entire disclosure of both applications are hereby incorporated by reference herein. This application also incorporates herein by reference U.S. Non-provisional patent application Ser. No. 11/807,325, Ser. No. 11/807,329 (U.S. Pat. No. 7,828,022), and Ser. No. 11/807,237.

FIELD OF THE INVENTION

The present invention relates generally to the field of 3D printers and in particular to powder and waste handling systems therefor.

BACKGROUND OF THE INVENTION

Generally, 3D printing involves the use of an inkjet type printhead to deliver a liquid or colloidal binder material to layers of a powdered build material. The printing technique involves applying a layer of a powdered build material to a surface typically using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed. See, for example, U.S. Pat. Nos. 6,375,874 and 6,416,850, the disclosures of which are hereby incorporated herein by reference in their entireties.

Apparatus for carrying out 3D printing typically generate dust, which can detrimentally effect the operation of the printheads. For example, the dust can clog the jet nozzles that dispense the binder material, which can result in no binder material being dispensed or the binder material being dispensed inaccurately.

Powder handling and powder and dust management are major problems in 3D printing. Loading powder into the feed piston generally involves lifting a heavy bucket of powder and pouring it in. This always causes a large dust cloud and often results in a lot of powder being spilled. The printing process also stirs up a lot of dust by spreading powder and dumping it into an overflow container. Once the part is printed, the unprinted powder must be removed from the build box in a process that is tedious and often very messy. The overflow container must be emptied back into the feed piston and this also involves lifting a heavy container, pouring powder out of the container, and the generation of a dust cloud, and often, spilled powder. Depowdering the part after it has been printed creates additional problems. Because of cost, most users want to recycle the powder removed from the part. Currently, this involves removing a vacuum bag from a vacuum cleaner, tearing it open, and pouring the powder into the feed piston. A sifting step is usually required, because broken pieces of a printed part may be vacuumed up. Both of these processes are extremely messy and get powder on the user, the floor, and the machine, and create dust clouds.

It is, therefore, an object of the present invention to provide apparatus and methods for automatically handling powder throughout a 3D printer system to reduce waste and minimize contamination of the system and surrounding area from loose powder.

SUMMARY OF THE INVENTION

The invention provides an apparatus for handling powder and other materials in a 3D printer and provides a means for automatically loading, applying, recovering, and filtering powder used in 3D printing. As a result, the efficiency of the 3D printing system can be improved, the waste generated by the process can be minimized, and contamination of the printer and surrounding area from escaped or spilled powder can be substantially reduced.

In one aspect, the invention relates to a powder handling system for a three-dimensional printer. The system can include a plurality of powder holding receptacles and a vacuum source coupled to the plurality of powder holding receptacles. The vacuum source transfers powder between the powder holding receptacles. In one embodiment, the system includes a multiport valve in fluidic communication with the plurality of powder holding receptacles and the vacuum source. The vacuum source transfers powder between the powder holding receptacles through the valve. The valve can be used to selectively connect the vacuum source to a particular powder holding receptacle or to isolate one or more powder holding receptacles from the vacuum source. The valve can be manually or automatically actuated.

In various embodiments, the powder holding receptacles can be at least partially disposed on or integrally assembled with the three-dimensional printer. In addition, the system can include an external powder source. The external powder source can be coupled to the vacuum source through, for example, the multiport valve. The powder holding receptacles can include a build chamber, a work space volume, a dispensing hopper, a depowdering chamber, and forward and rear overflow cavities. In one embodiment, the work space volume is the area located above the work surface of the printer, which is typically enclosed by a cover. This volume can be in fluidic communication with the vacuum source through a vent disposed within, for example, an overflow cavity or the work surface. In one embodiment, the system includes a filtration system disposed between the vacuum source and the plurality of powder holding receptacles. In addition, the system can include a pressure source for further assisting the transfer of powder between the powder holding receptacles. Furthermore, the vacuum system can operate on multiple speeds (i.e., high and low) and can be continuously operated at, for example, low speed to remove powder dust from the system between powder transfers.

In another aspect, the invention relates to a three-dimensional printer that includes a powder dispensing hopper, a build chamber for receiving powder, at least one printhead for selectively applying binder to a layer of powder in the build chamber, and a vacuum source coupled to the dispensing hopper and the build chamber. The vacuum source can transfer powder between the dispensing hopper and the build chamber. In one embodiment, the printer can include a multiport valve in fluidic communication with the dispensing hopper, the build chamber, and the vacuum source. The vacuum source can transfer powder between the dispensing hopper and the build chamber through the valve. The printer can include at least one overflow cavity coupled to the vacuum source. The vacuum source can transfer powder from the at least one overflow cavity through the valve to, for example, the dispensing hopper. In one embodiment, the vacuum source can be used to draw powder from any number of holding receptacles (e.g., build chamber, overflow cavity, etc.) to the dispensing hopper to refill the hopper.

In another aspect, the invention relates to a method of providing powder to a three-dimensional printer from multiple sources. The method includes the steps of providing a plurality of powder holding receptacles, the plurality of powder holding receptacles including at least one powder dispensing hopper adapted to be coupled to the three-dimensional printer, coupling the plurality of powder holding receptacles to a vacuum source, and transferring powder between the powder holding receptacles with the vacuum source.

In one embodiment, the method can include the step of providing a multiport valve between the vacuum source and the plurality of powder holding receptacles for selectively connecting the vacuum source to the powder holding receptacles. The method can further include the step of actuating the valve to selectively transfer powder to the powder dispensing hopper from one of the plurality of powder holding receptacles. The method can further include the step of providing a filtration system between the vacuum source and the plurality of powder holding receptacles.

In another aspect, the invention relates to a container for holding powder for a three-dimensional printer. The container includes a receptacle defining an interior volume adapted for holding a powder for producing three-dimensional objects and a cover coupled to the receptacle and at least partially enclosing the interior volume of the receptacle. The cover can include an outlet in fluidic communication with the interior volume, the outlet adapted to be coupled to a vacuum source of the three-dimensional printer, and at least one inlet in communication with the interior volume and adapted for passing air into the interior volume. The inlet can be at least partially defined by the receptacle and/or the cover.

In various embodiments, the air passing through the inlet assists the movement of the powder through the outlet by, for example, "sweeping" the powder down the sides of the receptacle and towards the outlet. In one embodiment, the internal volume has a generally conical shape; however, other shapes are contemplated and within the scope of the claims, for example frusto-conical, elliptical and any other combinations of polygonal and arcuate shapes. In one embodiment, the internal volume of the receptacle has an elliptical cross-sectional shape. Further, the outlet can include a tubular member extending downwardly from the cover to proximate a bottom region of the internal volume. Additionally, the inlet can be an annular slot and the outlet can include a fitting, for example a quick-disconnect type fitting, configured to mate with a hose. In one embodiment, the container can include a housing disposed about the receptacle. The housing can be configured for stacking with other like containers.

In another aspect, the invention relates to a build chamber for use in a three-dimensional printer and adapted for receiving powder for producing three-dimensional objects. The chamber includes a build surface for receiving the powder. The build surface includes a first plate defining a plurality of spaced apart openings having a pitch and a second plate defining a plurality of openings spaced apart and offset from the plurality of holes in the first plate by approximately 50% of the pitch of the plurality of holes in the first plate. The pitch corresponds to the space between proximate edges of adjacent openings and is approximately equal to 2(space between the plates)(cotangent of an angle of repose of the powder)+ (diameter of holes). The second plate is disposed below and spaced from the first plate.

In various embodiments, the chamber includes at least one wall at least partially circumscribing the build surface and at least partially defining the chamber, a piston disposed below the build surface and adapted to the build chamber to move the build surface vertically relative to the at least one wall, and an outlet coupled to the build chamber and disposed below the build chamber for removing unbound powder from the build chamber when a vacuum is applied. The build chamber can also include a cover disposable above the at least one wall to at least partially isolate the chamber from its environment. The cover may include a seal to reduce or prevent the ingress of air when the vacuum is applied. In one embodiment, the outlet is located in a plenum disposed below the build surface. The outlet can be coupled to a vacuum source to draw unbound powder out of the build chamber through the build surface. In addition, the first plate and the second plate of the build surface are interchangeable with plates adapted for differing angles of repose, for example different size openings and different pitches between openings. In an alternative embodiment, the build surface can include more that two plates. The build surface can include one or more spacers disposed between the first plate and the second plate to maintain a fixed spacing between the plates, and the first plate and the second plate of the build surface are movable relative to one another. For example, one or both plates can be moved vertically to vary the spacing therebetween and/or horizontally to vary the offset of the holes. Spacers of differing sizes can be used to vary the spacing between the plates. In one embodiment, the build chamber includes a vacuum source coupled to the outlet for fluidizing the powder. In addition, the build chamber can include a mechanism for transferring vibration to at least a portion of the build chamber, for example the build surface.

In another aspect, the invention relates to a method of controlling the flow of unbound powder in a build chamber. The method includes the steps of providing a build surface for receiving the powder and providing a vacuum source below the build surface. The build surface includes a first plate defining a plurality of spaced apart openings having a pitch and a second plate defining a plurality of openings spaced apart and offset from the plurality of holes in the first plate by approximately 50% of the pitch of the plurality of holes in the first plate. The pitch corresponds to the space between proximate edges of adjacent openings and is approximately equal to 2(space between the plates)(cotangent of an angle of repose of the powder)+(diameter of holes). The second plate is disposed below and spaced from the first plate.

In various embodiments, the method includes the step of maintaining ambient pressure within the build chamber to prevent flow of powder through the build surface. The method may also include the steps of activating the vacuum source to create a vacuum beneath the build surface to cause the powder to flow through the first and second plates, vibrating the build surface to promote flow of unbound powder, and varying the space between the first plate and the second plate to accommodate powders having different angles of repose. Furthermore, the build chamber can include a plenum disposed below the build surface for coupling the vacuum source to the build chamber. The plenum can include an outlet for removing unbound powder from the build chamber when the vacuum source is activated. In one embodiment, the build chamber includes at least one wall at least partially circumscribing the build surface and at least partially defining the chamber and a piston disposed below the build surface and adapted to the build chamber to move the build surface vertically relative to the at least one wall. At least one of the first plate and the second plate can be interchangeable with plates adapted for differing angles of repose In another aspect, the invention relates to a powder dispensing hopper for providing powder to a three-dimensional printer. The hopper includes a chamber defined by the hopper for receiving powder and a dispensing mechanism at least partially disposed within the chamber. The hopper can be disposed relative to a build surface on the three-dimensional printer. The chamber defines at least one outlet sized and arranged to pass a predetermined amount of powder therethrough and the dispensing mechanism is adapted to push powder through the at least one outlet. The outlet is sized relative to the powder to be dispensed such that substantially no powder passes through the outlet without the dispensing mechanism providing a positive force on the powder proximate the outlet.

In various embodiments, the at least one outlet includes a plurality of slots oriented longitudinally along a lowest surface of the chamber. The width of the outlet can vary along the length of the outlet to, for example, deposit more or less powder at specific locations along the outlet. Additionally or alternatively, the length of the outlet can be adjusted to correspond to different size build surfaces. The hopper can include a cover for opening and closing the at least one outlet. In one embodiment, the dispensing mechanism is adapted to automatically push powder through the at least one outlet at predetermined intervals. In addition, the dispensing mechanism can include a plurality of blades spaced about a radial axis oriented parallel to the at least one opening, the blades coupled to a rotary mechanism for rotating the blades proximate the at least one outlet to push the powder out of the at least one outlet. In one embodiment, the position of the dispensing mechanism can be varied relative to the outlet to, for example, accommodate powders having different particle sizes.

Furthermore, the chamber can define an inlet disposed proximate a top portion of the chamber for receiving powder. The chamber can be coupled to a vacuum source for drawing powder into the chamber though the inlet from a remote source. The inlet can include a diffuser for dispersing the powder entering the chamber. The shape and size of the diffuser will vary to suit a particular application. The hopper can also include a filtering system disposed between the inlet and the vacuum source.

In another aspect, the invention relates to a filter system for use in a powder transfer system of a three-dimensional printer. The system includes a filter adapted for air flow in two directions and having at least two sides and a plenum disposed on one side of the filter. The plenum is segmented and sealed against the side of the filter to isolate portions of the filter from one another. The plenum is adapted to expose the individual filter portions to at least one of a vacuum and a positive pressure. In one embodiment, the positive pressure is atmosphere. The plenum can be segmented into essentially any number of segments, for example, two, four, or eight segments.

In various embodiments, each plenum segment includes a valve for connecting an associated filter portion to a vacuum source for drawing air carrying powder through the filter, the filter preventing the powder from passing therethrough. In addition, the valves can be adapted to connect the associated filter portion to a positive pressure. In one embodiment, the valves can be two-way, three-position type valves, such that a single valve assembly can be used to shift between vacuum and positive pressure in communication with the filter portion. In one embodiment, the filter portions are alternately exposed to the vacuum source and the positive pressure. Additionally, the filter portion can be alternately exposed to the vacuum source and the positive pressure sequentially. Further, the system can be adapted for mounting to an inlet of a powder dispensing hopper. The filter can be coated with an abrasion resistant material to reduce filter damage from exposure to the powder.

In another aspect, the invention relates to a multiport valve for use in a powder transfer system of a three-dimensional printer. The valve includes a first portion defining a port radially disposed a fixed distance from a central point and a second portion coupled to the first portion at the central point. The second portion is rotatable relative to the first portion and defines a plurality of ports. The plurality of ports are radially disposed about the central point from the same fixed distance as the port on the first portion, so that each port is alignable with the port in the first portion when the second portion is rotated to a set position, thereby enabling flow therebetween.

In various embodiments, the second portion can be rotated relative to the first portion by a motor and gear assembly. The second portion can be automatically rotated relative to the first portion in response to a signal. In one embodiment, the valve includes at least one stop to limit rotational travel of the second portion relative to the first portion. The valve can also include a seal disposed between the first portion and the second portion, where the first portion and the second portion are biased into contact with the seal disposed therebetween.

In another aspect, the invention relates to a printhead capping station for use in a three-dimensional printer. The capping station includes a printhead cap carrier and at least one printhead cap disposed on the carrier for sealing a printhead face of a printhead. The carrier maintains the cap in a vertical position relative to the printhead face in a neutral position, i.e., not in contact with the printhead or a printhead carriage. The cap is moved between an off or neutral position and a capped position by at least one of the printhead and the printhead carriage contacting the carrier.

In various embodiments, the capping station includes a plurality of caps disposed on the carrier. The plurality of caps may be spaced to align with a plurality of printheads in a carriage. In one embodiment, the carrier includes a fixed support, a movable support, and an actuator tab for contacting at least one of the printhead and the printhead carriage. Forward movement of at least one of the printhead and the printhead carriage into contact with the actuator tab causes the movable support to pivot relative to the fixed support, thereby orienting the cap into a horizontal position relative to the printhead face. Continued movement of at least one of the printhead and the printhead carriage causes the cap to seal against the printhead face. Further, the capping station can include a stop adapted for preventing continued forward movement of the printhead once capped. In one embodiment, the printhead cap is made of a compliant material that can expand and contract in response to a change in pressure when capping the printhead face (e.g., an increase in pressure may occur when the cap interfaces with the printhead face), thereby obviating the need for a vent in the cap. In one embodiment, the capping station uses a four-bar linkage for moving the cap between the vertical position and the horizontal position.

In another aspect, the invention relates to a waste handling system for a three-dimensional printer. The system includes a receptacle for receiving printhead discharge material, a holding receptacle in communication with the receiving receptacle, and a drain for channeling the printhead discharge material to the holding receptacle. The holding receptacle can include an absorptive medium adapted to absorb at least a portion of the printhead discharge material, where at least a portion of the printhead discharge material solidifies within the holding receptacle.

In various embodiments, the holding receptacle is adapted to promote evaporation of at least a portion of the printhead discharge material. The system, for example the holding receptacle, can include an air transfer system for accelerating a rate of evaporation of the at least a portion of the printhead discharge material. The air transfer system can use waste heat from the three-dimensional printer to accelerate the rate of evaporation. In one embodiment, the absorptive medium is removably disposed within the holding receptacle for easy disposal and replacement with a fresh absorptive medium. Alternatively or additionally, the holding receptacle can be a disposable component.

In another aspect, the invention relates to an electrical connection system for printheads in a three-dimensional printer. The connection system includes a base plate for connecting the system to a signal source, the base plate comprising a plurality of solder pads disposed in a set pattern, a connector mounted to the base plate and adapted for providing a signal to a printhead, the connector defining a plurality of stepped through holes oriented in the connector to correspond with the solder pads, and a plurality of pogo pins selectively disposed within the stepped through holes of the connector, the pogo pins supplying signals to the printheads from the signal source. The signal can provide at least one of power and instructions to the printhead. In one embodiment, the system includes a seal disposed between the connector and the base plate to prevent ingress of contamination.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 5E is an alternative view of the actuation method of FIG. 5D, with the plenum divider and gear not shown for clarity;

FIG. 5F is a schematic bottom view of a diffuser in accordance with one embodiment of the invention, for use in the dispensing hopper of FIG. 5A;

FIG. 5G is a schematic cross-sectional view of the diffuser of FIG. 5F taken at line 5G-5G of FIG. 5A;

DETAILED DESCRIPTION

The systems and components described herein can be used with various 3D printers and related apparatus, such as those disclosed in U.S. Pat. No. 5,902,441, U.S. Pat. No. 6,007,318, U.S. Patent Application No. 2002/0079601, U.S. Patent Application No. 2004/0012112, U.S. Patent Application No. 2004/0265413, U.S. Patent Application No. 2005/0280185, U.S. Patent Application No. 2006/0061613, and U.S. Patent Application No. 2006/0061318, the entire disclosures of which are hereby incorporated herein by reference.

In one embodiment of the invention, a pneumatic means of handling powder is provided, allowing the powder to be transferred from one location to another within the 3D printer system automatically and quickly with minimal or substantially no loss of powder or contamination of the printer and/or surrounding environment. A schematic diagram showing elements of this configuration can be seen in FIG. 1.

Figure 1:
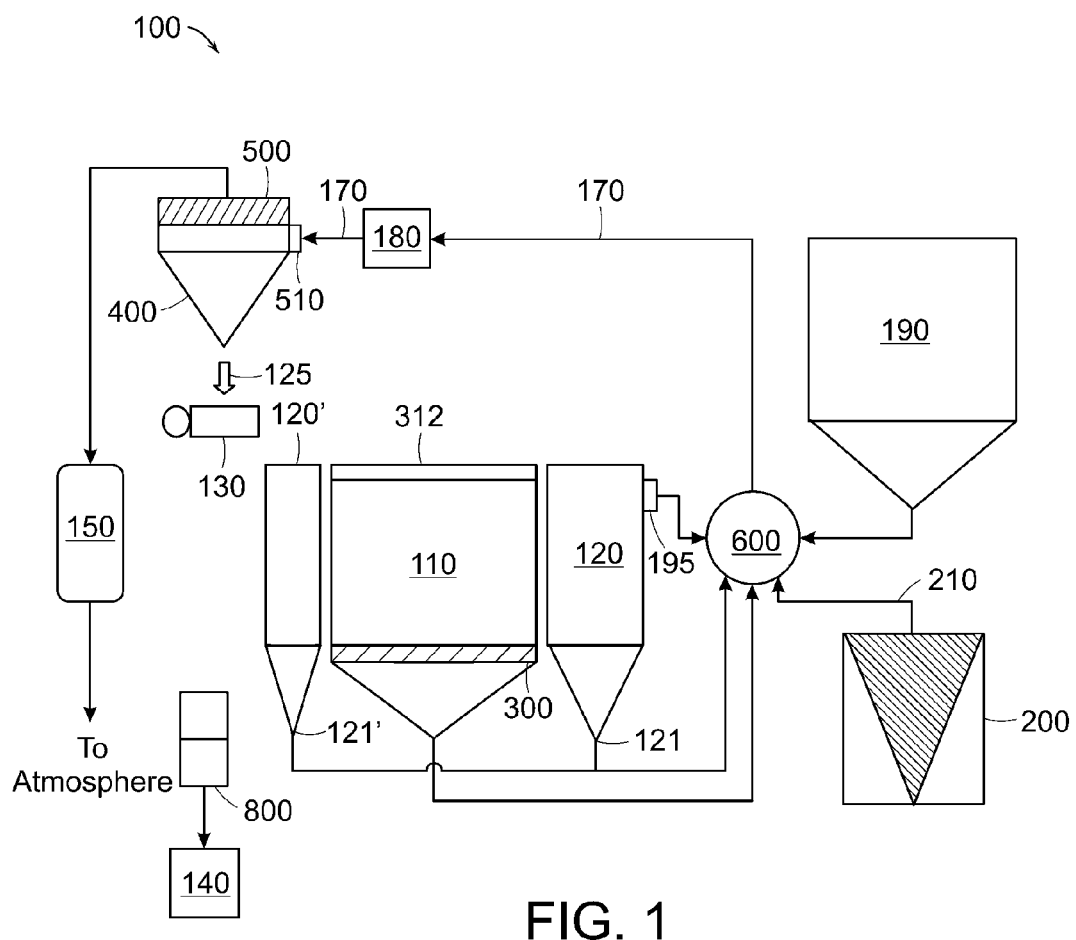
FIG. 1 is a schematic view of a 3D printer and accompanying powder handling system, in accordance with one embodiment of the invention.

FIG. 1 shows a powder handling system 100 for a 3D printer. The 3D printer includes a build chamber 110, where the 3D object is created, and at least one overflow chamber 120 to collect excess powder used during printing. In some embodiments, the overflow chamber 120 is located adjacent to the build chamber. In some embodiments, the system 100 includes two overflow chambers 120, 120', a forward overflow chamber 120 and a rear overflow chamber 120'. Powder for use in the 3D printer is contained within a dispensing hopper 400. The powder is dispensed 125 from the dispensing hopper 400 onto a gantry 130 or work surface of the printer through a slot at the bottom of the hopper 400. The gantry 130 can then spread the powder across the build platform in the same manner as with the 3D printers disclosed herein. The dispensing hopper 400 can be loaded automatically from the powder handling system 100 without exposing the user or environment to powder or dust. A waste collector unit 800 can be used to collect any liquid waste produced during the printing process. Any liquid waste collected by the waste collector unit 800 can then be channeled into a container 140, either with or without processing and/or filtering, for removal.

In one embodiment, binder liquid is applied by a moveable gantry 130 suspended over the build table, including the build chamber 110 and the overflow chambers 120, 120'. The gantry 130 can also include a spreader for transferring build material from the dispensing hopper 400 to the build table to create incremental layers. The gantry 130 can also include binder jets in at least one binder cartridge, each binder jet being coupled to a supply of binder to selectively deposit binder on the layers of build material. In an alternative embodiment, the dispensing hopper 400 can dispense powder directly onto the build table for spreading.

In one embodiment of the invention, the powder handling system 100 can include a pneumatic system to move powder from one location to another within the system 100. In this embodiment, a vacuum source 150, such as a blower motor, can be connected to the dispensing hopper 400 to create a negative pressure inside the system.

As a result, air, and any powder or dust suspended within the air, will be sucked into the dispensing hopper 400 through its inlet portion 510. The powder can enter the dispensing hopper 400 through a hose 170. The hose 170 can be connected to an optional valve assembly 600 that allows powder to be drawn into the hose 170 from multiple sources. Any debris carried within the powder can be prevented from entering the dispensing hopper 400 by a screen or "chunk separator" 180.

A powder filter assembly 500 is used to separate the powder entering the dispensing hopper 400 through the hose 170 from the air. As a result, all powder entering the dispensing hopper 400 is held in the hopper 400 for use in the 3D printer. The filtered air, free of powder, travels on to the vacuum source 150 and can then be vented out into the atmosphere, or in some embodiments utilized for other purposes within the 3D printer system.

Powder for the dispensing hopper 400 can be provided from multiple locations, with the valve 600 used to switch the airflow path from one powder source to another. In the powder handling system 100 of FIG. 1, powder can enter the valve from the build chamber 110, the overflow chambers 120, 120', a depowdering chamber 190, or a powder container 200. A vent 195 in the side of the overflow chamber 120, collecting dust and powder from the work space, can also provide a further source of powder during operation of the 3D printer.

During operation of the 3D printer, excess powder from the build chamber 110 drops into one or both of the overflow chambers 120, 120'. During the build, the vacuum source 150 can be run at a low speed to create an airflow from the vent 195, through the valve 600, and thus into the dispensing hopper 400. This does not fully eliminate the creation of dust during operation, but can significantly reduce the spread and deposition of powder dust in the machine and surrounding area. With the inlet of the vent 195 placed inside the overflow chamber 120, for example near the top, dust deposition can be greatly reduced. This is due to the cloud of dust generated when the powder hitting the bottom of the overflow chamber 120, or the previously deposited powder in the overflow chamber 120 being sucked into the airflow and into the dispensing hopper 400 before it can escape from the overflow chamber 120.

After a print job is completed, the powder valve 600 can be actuated to allow the airflow to travel from the other sources of powder to refill the dispensing hopper 400 and recycle any excess powder used in the prior run. For example, the valve 600 can open the airflow from the build chamber 110, allowing the unprinted powder in the build chamber 110 to be removed and returned to the dispensing hopper 400, without user intervention. In one embodiment of the invention, a build surface 300 including choke plates is placed in the bottom of the build chamber 110. These choke plates can stop any powder falling through the bottom of the build chamber 110 during a build run, but then allow the excess, unprinted powder to be sucked out through the bottom of the build chamber 110 and into the dispensing hopper 400 when the valve 600 opens the airflow path from the blower and applies a negative pressure to the bottom of the build surface 300.

The valve 600 can also open an airflow path from the overflow chambers 120, 120' to the dispensing hopper 400 via the overflow chamber outlets 121, 121'. As shown in FIG. 1, the overflow chamber outlets 121, 121' are connected to a single port of the valve; however, each outlet 121, 121' can be connected to a separate port on the valve 600. After a print job, the excess powder collected in the overflow chambers 120, 120' during operation can be removed from the overflow chambers 120, 120' automatically and returned to the dispensing hopper 400 to be reused. Additionally or alternatively (e.g., where no vent 195 is supplied), the vacuum source 150 can be run at low speed to create an airflow from the overflow chamber outlets 121, 121', through the valve 600, to remove powder dust from the system.

In an alternative embodiment, the valve 600 may allow airflow to the dispensing hopper 400 from multiple locations at once. In a further alternative embodiment, the valve 600 can be replaced by a number of separate valves that may control the airflow from each source to the dispensing hopper 400 separately.

In some embodiments of a 3D printer, once a completed part has been removed from the build chamber it can be placed in a depowdering chamber 190 to remove any remaining loose powder from the part. The depowdering chamber 190 may include a screen above a funnel shaped container which is also plumbed to the valve 600, such that any excess powder cleaned from the part can be sucked back to the dispensing hopper 400 for recycling. In an alternative embodiment, the final depowdering can be carried out within the build chamber itself, with the loose powder being sucked through the choke plates of the build surface 300 and back to the dispensing hopper 400.

Once all the available excess powder has been recycled from the various parts of the 3D printer, additional powder can be added to the dispensing hopper 400 by connecting a powder container 200 to the valve 600. The powder container 200 can then be used to top off the dispensing hopper 400 so that sufficient powder is in the dispensing hopper 400 to start a new print run. It should be noted that the valve 600 may be connected to any number of powder sources, including all or some of those listed above, and may either be manually actuated to provide an airflow from a given source to the dispensing hopper 400, or be automatically controlled to provide an airflow to a number of individual sources in any given order.

In an alternative embodiment of the invention, the powder container 200 can be connected directly to the dispensing hopper 400 through the hose 170, without the need for the valve 600. In a further alternative embodiment, any one or more of the sources of powder may be connected directly to the dispensing hopper 400 through the hose 170, without the need for the valve 600. In such an embodiment, powder may be transferred from multiple locations at once, with powder being entrained both from sources connected directly to the hose 170 and from sources coupled to the valve 600. Alternatively, the valve 600 may be shut off or removed completely, so that only sources connected directly to the hose 170 may be used to supply powder to the dispensing hopper 400.

This system, therefore, provides a means of recycling unused powder from a number of locations within the 3D printer automatically with little or no user input required. The valve 600 and blower 150 can be controlled by a PC or other interface, allowing the powder handling system 100 to either run automatically according to a preset program, or be actuated remotely through inputs provided by a user. During use, the powder handling system 100 can be used to reduce the creation of dust by sucking excess powder up through the vent 195 connected to the overflow chamber 120. In alternative embodiments, further vents, or differently located vents, may be utilized to further collect any excess powder dust and thus reduce the contamination of the 3D printer and surrounding environment during operation.

Upon completion of a given build, excess powder can be removed from the various parts of the 3D printer through the powder handling system 100, thus allowing the maximum amount of powder to be recycled, while cleaning the 3D printer without the need for direct intervention by an operator. This can greatly reduce the amount of powder and dust escaping and possibly contaminating the 3D printer parts and surrounding environment, while also reducing the time required to maintain and clean the 3D printer between runs. By more effectively recovering and recycling excess powder, and reducing cleaning and maintenance requirements for the operator, the powder handling system 100 can, therefore, significantly improve the efficiency of a 3D printer, while also reducing the costs involved with running such a printer.

Figure 2A:
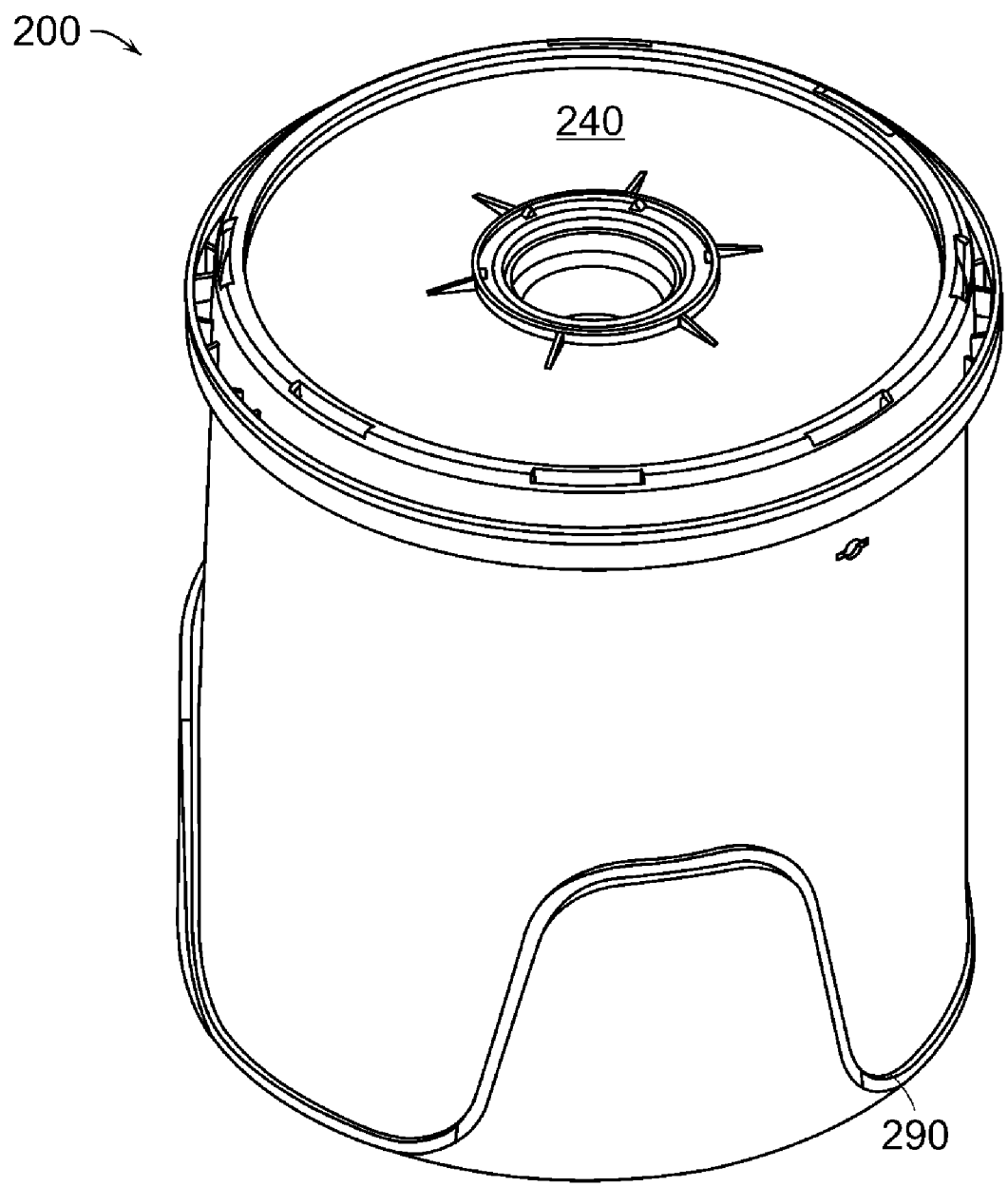
FIG. 2A is a schematic perspective view of a powder container for use with a 3D printer, in accordance with one embodiment of the invention.
Figure 2B:
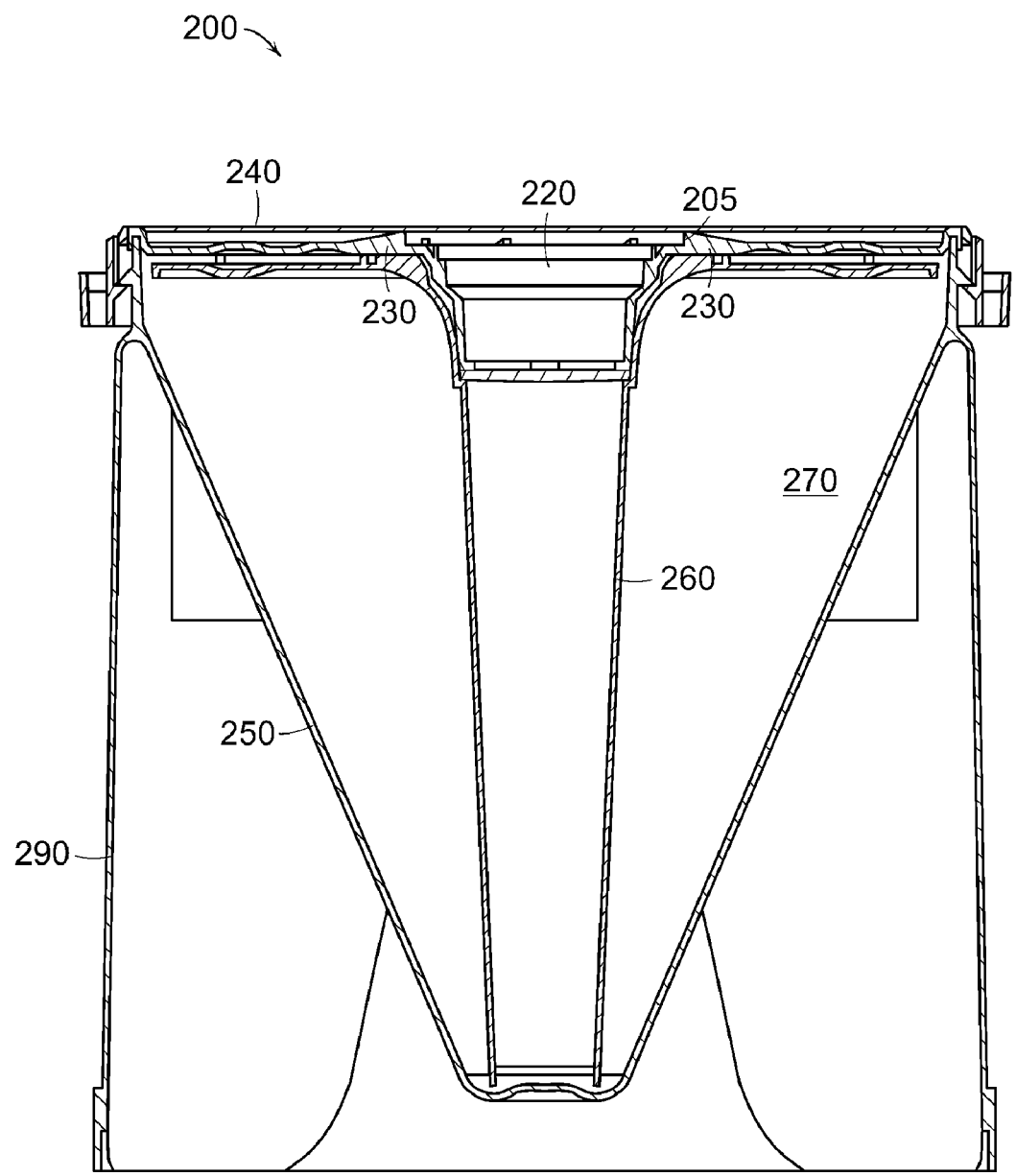
FIG. 2B is a schematic side view of the powder container of FIG. 2A.
Figure 2C:
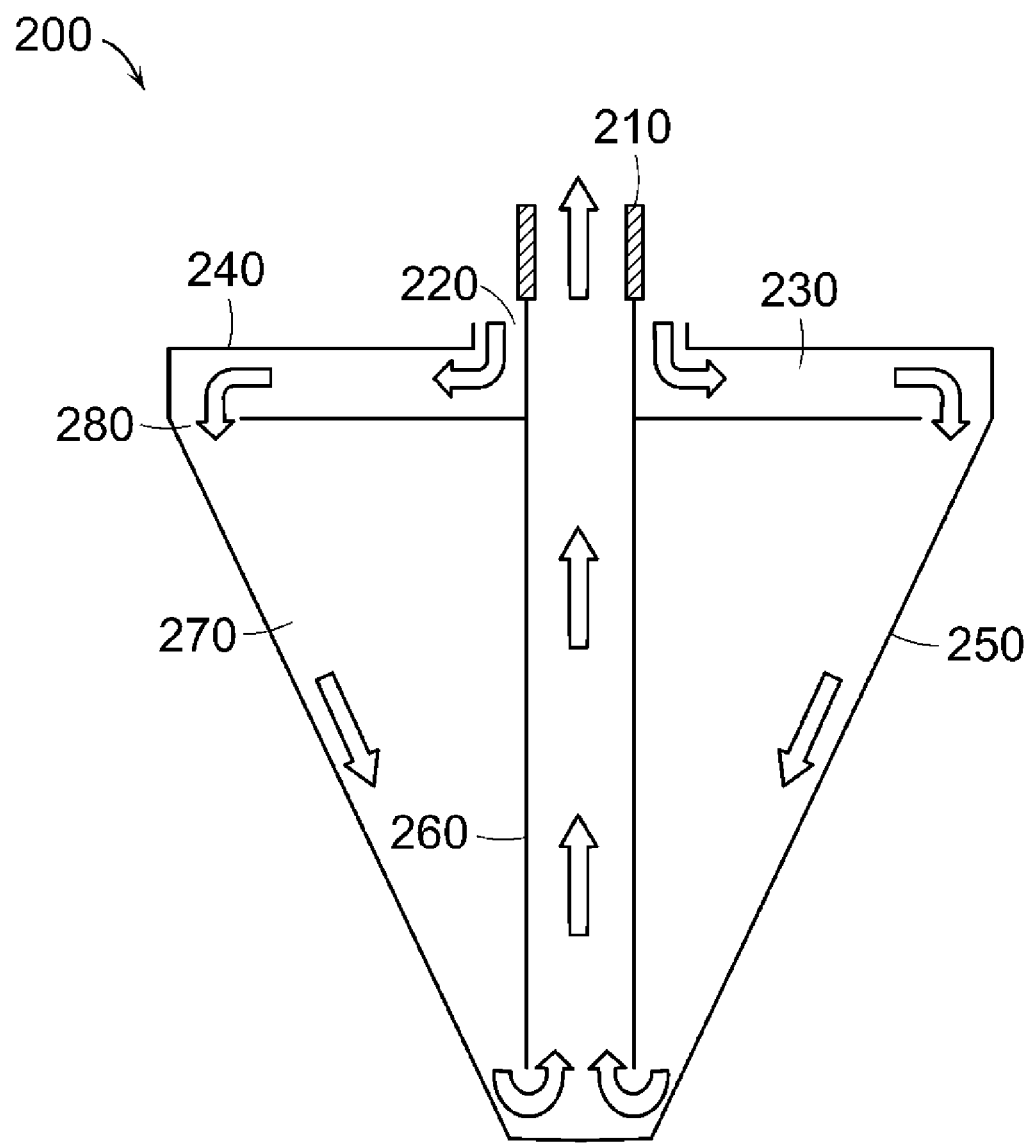
FIG. 2C is a schematic side view illustrating the air flow through the powder container of FIG. 2A.

In one embodiment of the invention, powder for the 3D printer can be provided by the powder container 200, an example of which is shown in FIGS. 2A to 2C. In this embodiment, the powder container 200 can be connected by an air hose 210 to the valve 600 of the powder handling system 100 (or be connected directly to the hose 170 as described above), allowing the powder to be automatically transferred into the dispensing hopper 400, with minimum effort by a user.

The powder container 200 can be shipped and stored with a safety cap 205 covering a vacuum hose connection 220 and a vent 230. Once the safety cap has been removed, the vacuum air hose 210 can be coupled to the vacuum hose connection 220 to allow the powder handling system 100 to collect powder when the vacuum source 150 is turned on and the valve 600 is correctly positioned. Alternatively, the vacuum hose connection 220 can be connected directly to the hose 170, as described above.

The powder container 200 can include a lid 240 and a conical side wall 250 attached thereto. The side wall 250 may, in one embodiment, form a conical shape with a circular or elliptical cross-section, although any appropriate cross-sectional shape may be utilized. An elliptical cross-sectional shape is desirable, because the shape may reduce or eliminate the tendency of the powder to bridge. When the safety cap is placed on the powder container 200, no air is able to enter or exit the container 200. Upon removal of the safety cap, air may enter the interior of the container 200 through a vent 230 housed within the lid 240, and exit through an internal nozzle 260 placed within the center of the container 200 and attached to the vacuum hose connection 220. An outer wall or housing 290 may also be included to allow the powder container 200 to be stacked easily. In one embodiment, the powder container 200 and its related components can be manufactured from a high density polyethylene by, for example, injection molding.

In use, air flows in through the vent 230 and enters the powder holding area 270 of the container 200 through an annular slot 280 at the outer edge of the lid 240. The air then travels down the side wall 250 of the powder holding area 270, encouraging the powder to flow down to the bottom of the powder holding area 270 and into the internal nozzle 260. The powder is then entrained into the air and ascends through the internal nozzle 260 and into the powder handling system 100. FIG. 2C shows the path of the air flow though the powder container 200 when the air hose 210 is coupled to the vacuum hose connection 220 and the vacuum source 150 is turned on. As can be seen, air from the surrounding atmosphere enters the container 200 through the vent 230 and exits through the air hose 210 (or exits directly into the hose 170, as described above). The conical geometry of the powder holding area 270 assists the powder flow down towards the bottom of the internal nozzle 260, and makes sure all available powder is entrained by the powder handling system 100.

In an alternative embodiment, a vent, or multiple vents, may be placed at different locations on the powder container 200, and may be covered by separate safety caps. In a further alternative embodiment, the vacuum hose connection 220 may include a quick disconnect hose fitting that automatically seals when the hose is disconnected and opens when the hose is connected (also opening the vent or vents). In this embodiment, the safety cap would not be needed.

An apparatus for automatically gross depowdering 3D printed parts may be included within the build chamber 110. Generally, this apparatus consists of a build piston made up of a plenum plumbed to a vacuum source and covered with a plate with a sparse pattern of small holes in it, known as a choke plate. Many powders have flow properties which allow them to bridge over the holes at ambient pressure so that a part can be 3D printed in the same manner as with a solid build piston. After printing, the vacuum source can be activated, dropping the pressure below the build plate to below atmospheric pressure, and forcing the powder to flow through the holes in the choke plate and thus partially depowdering the 3D printed part.

Figure 3A:
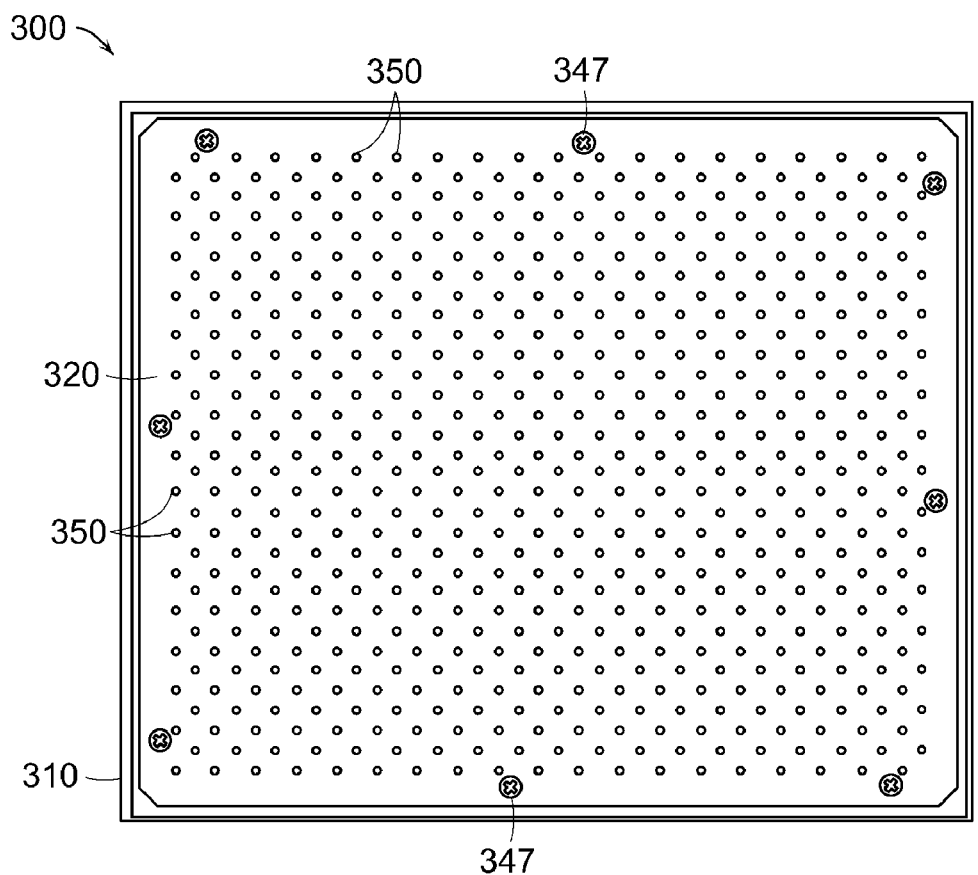
FIG. 3A is a schematic plan view of a build surface including a choke plate placed within a build chamber, in accordance with one embodiment of the invention.

Some powders, however, such as fine dry sand, glass beads, or Zp® 130 powder (available from Z Corporation) that have been vacuum recycled enough to remove all the fines, flow so easily that they can fall through the holes in the choke plate during a 3D printing process. Some flow so easily that the 3D printing process cannot be started because the bed preparation process fails due to flow through the choke plate. An example choke plate can be seen in FIG. 3A.

Figure 3C:
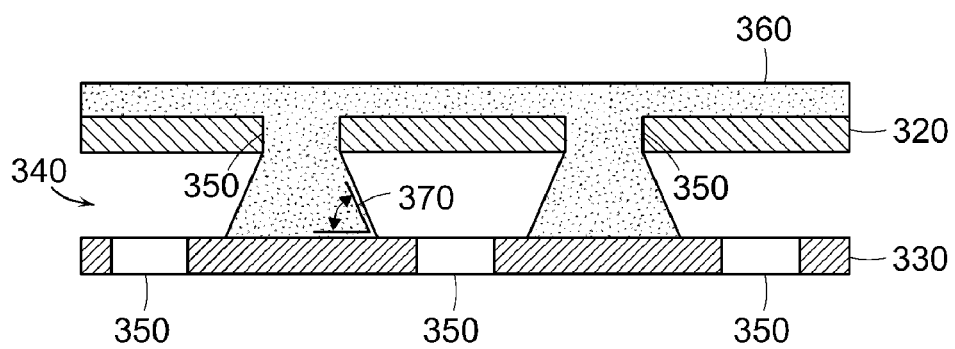
FIG. 3C is a schematic side view of one section of the build surface of FIG. 3B with the air flow valve closed.
Figure 3B:
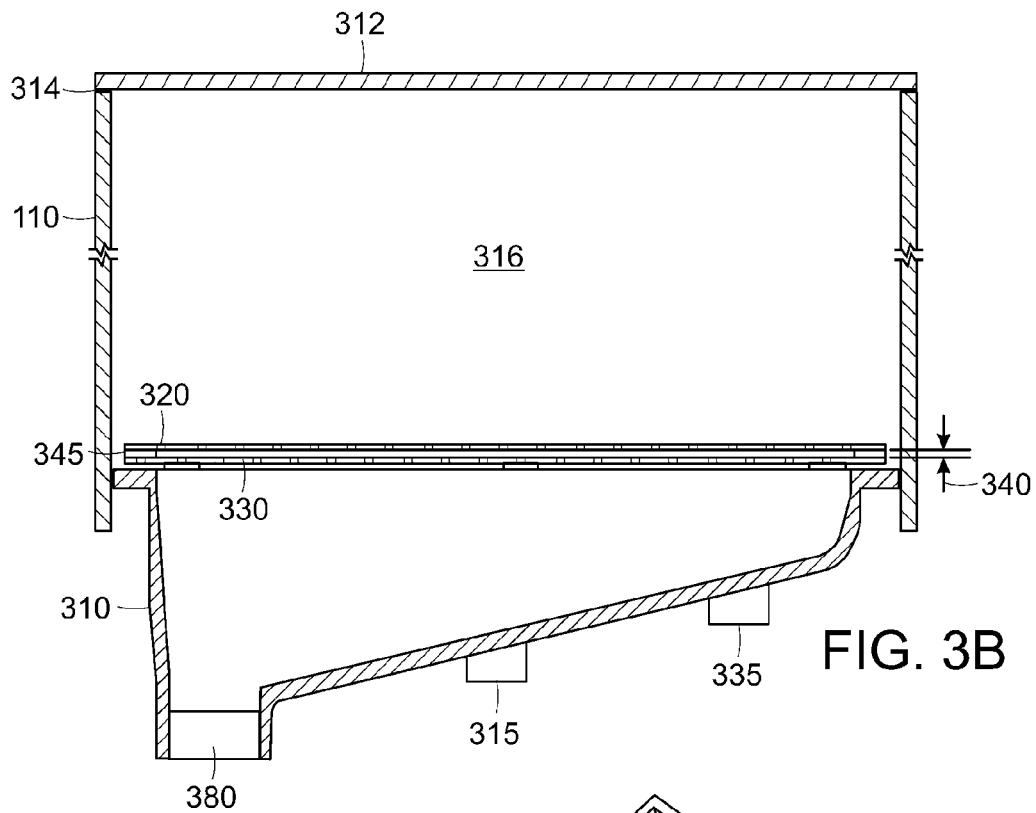
FIG. 3B is a schematic side view of a build surface including a two level choke plate and plenum, in accordance with one embodiment of the invention.

In one embodiment of the invention, the bottom surface 300 of the build chamber 110 can utilize a choke plate arrangement including multiple choke plates to provide a means of removing excess powder from the build chamber 110 upon completion of a build run. An example build surface 300 including choke plates 320, 330 and funnel 310 (or plenum) can be seen in FIGS. 3A and 3B. This gross depowdering allows the majority of the excess powder to be removed from the build chamber before the 3D printed part is removed, allowing the part to be removed easily from the build chamber for final depowdering.

During operation, a piston can lower the build surface 300 within the build chamber to allow the 3D part to be formed within the chamber, as disclosed in the previously mentioned patents and patent applications. The piston may be connected to the underside of the plenum/funnel 310 by a mount 315. In one embodiment, the plenum 310 is manufactured from a polymeric material, such as Noryl® PX 1391, a polyphenylene ether polystyrene blend available from the GE Company.

By using a build surface 300 with two or more separate choke plates horizontally and vertically offset from each other, the present invention can overcome the failings of the prior art and provide a passive system that prevents any and all powder flow into the plenum during the printing process, while still allowing the powder to flow during the depowdering process, when a negative pressure is introduced below the choke plate. An example of the build surface 300 and plenum 310 can be seen in FIGS. 3B and 3C.

In this embodiment, the build surface 300 includes an upper choke plate 320 and a lower choke plate 330 separated by a vertical gap 340. In one embodiment, the vertical gap 340 is maintained by the use of spacers 345. In addition, the choke plates 320, 330 can be secured to each other by mechanical fasteners 347. The hole pattern in the upper choke plate 320 is offset horizontally from the hole pattern in the lower choke plate 330 so that none of the holes 350 in either plate line up vertically. For example, for uniformly spaced holes the preferred offset is approximately half the pitch between consecutive holes. It should be noted that in certain embodiments the holes need not be uniformly spaced, but rather can be spaced in any appropriate pattern to provide the required spacing for use of the system. In one embodiment, the choke plates are manufactured from stainless steel.

The vertical gap 340 should be small enough so that the angle between the edge of the hole in the upper choke plate 320 and the edge of the corresponding hole in the lower choke plate 330 is larger than the angle of repose 370 of the powder being used. It should be noted that "angle of repose" is an engineering property of interest for particulate solids. When bulk particles are poured onto a horizontal surface, a conical pile will form. The angle between the edge of the pile and the horizontal surface is known as the angle of repose and is related to the density, surface area, and coefficient of friction of the material. Material with a low angle of repose forms flatter piles than material with a high angle of repose.

In one embodiment of the invention, the height of the vertical gap 340 can be adjusted to ease in the removal of powder or adapt the build surface 300 for use with different powders. This adjustment may either be carried out manually (e.g., using spacers of varying heights) or automatically by a motor and/or piston arrangement connected to the build surface.

The vertical gap 340 should be sufficiently larger than the largest desired particle size of the powder to allow the powder to flow easily between the upper choke plate 320 and the lower choke plate 330 during operation. The plenum 310 is placed below the build surface 300 and attached to a vacuum hose connection 380. An air hose can then be coupled to the vacuum hose connection 380 and lead to the valve 600. A negative pressure can, therefore, be created within the plenum 310 by opening the valve 600 and turning on the vacuum source 150.

In operation, the build surface 300 forms the bottom of the build chamber 110. During operation of the 3D printer, the valve 600 is closed, allowing the powder 360 to settle on the upper choke plate 320. As can be seen from FIG. 3C, the powder 360 may flow through the holes 350 in the upper choke plate 320 and settle in a conical pile within the vertical gap 340 with a set angle of repose 370. As the lower choke plate 330 is sufficiently offset from the upper choke plate 320, the powder 360 settles on the surface of the lower choke plate 330 and does not fall through the holes 350 in the lower choke plate 330. As a result, the combined choke plates provide support for the powder 360, allowing the powder 360 to be uniformly spread over the build surface 300 as required for 3D printing.

Once a 3D object has been printed, the valve 600 can be opened and the vacuum source 150 turned on. This creates a negative pressure below the lower choke plate 330. This negative pressure will create a sufficient suction to fluidize the powder 360 and force it to flow through the holes 350 in the upper choke plate 320, through the vertical gap 340, and out through the holes 350 in the lower choke plate 330. As a result, the powder can be quickly removed from the build chamber 110 and returned to the dispensing hopper 400 to be reused. To enhance the powder removal function, an optional cover 312 can be used. The cover 312 can be placed on or over the build chamber 110 after printing is complete. The cover 312 isolates an internal volume 316 of the build chamber 110 from the surrounding environment. A seal 314 can be disposed between the cover 312 and chamber 110 to reduce or eliminate air leaks.

In an alternative embodiment of the invention, the lower choke plate 330 may be movable horizontally with respect to the upper choke plate 320 to allow the holes to be moved from an offset to an aligned configuration, thus increasing the flow of powder through the choke plates during depowdering. In this embodiment, a vertical gap may not be required between the upper choke plate and lower choke plate, as the powder would be free to flow through the holes in the two plates when they are aligned, regardless of whether there was a vertical gap or not. A motor, or other appropriate actuation method, may be used to move one of the plates, or both of the plates, from the offset (i.e. non-aligned) configuration to the aligned configuration.

In certain embodiments of the invention, choke plates with different sized holes, or with different configurations of holes, can be provided depending upon the specific powder being used. Alternatively, the build surface 300 can be designed such that a single pair of choke plates are able to support the powder regardless of the specific powder being used. In a further embodiment, the build surface 300 includes a vibration mechanism 335, so that one or more choke plates may be vibrated to assist in the removal of powder from the build chamber. Additionally or alternatively, the entire assembly (i.e., plenum 310, choke plates 320, 330, etc.) can be vibrated to assist in powder removal. In one embodiment, the vibration mechanism 335 is a small DC motor with an eccentric load disposed on its shaft, the unbalanced load imparting a vibration on the chamber 110.

One embodiment of the invention includes a means of dispensing the powder from the dispensing hopper 400 once it has been pneumatically conveyed there. When applying powder for use in 3D printing, it is generally advantageous for the powder to be dispensed in a line of length approximately equal to the width of the build piston. There are a number of means of dispensing powder at a point, but these are inefficient of vertical space (because the storage hopper tapers to a point, like a cone) and they would require an additional mechanism to spread the powder along the length of the spread roller before the spread roller could spread the powder across the build piston. The dispenser also needs to dispense the powder uniformly along the length of the spread roller so that all areas of the build piston are fully covered without an excess amount of powder being dumped into the overflow. The amount of powder dispensed also needs to be repeatable so that substantially the same amount is dispensed for each layer. In general, it is also desirable that the dispensing means not shear the powder as this may change the characteristics of the powder by further mixing the ingredients. Many 3D printing powders can be damaged, or reduced in effectiveness, by high shear.

It is also desirable that the means of dispensing powder will work with powders having a wide variety of flow characteristics and packing densities. The dispensing system must further work over a wide range of powder moisture content and must not clog with powder or change the volume of powder dispensed, regardless of environmental conditions, powder type, powder condition, or duration of use.

Figure 4A:
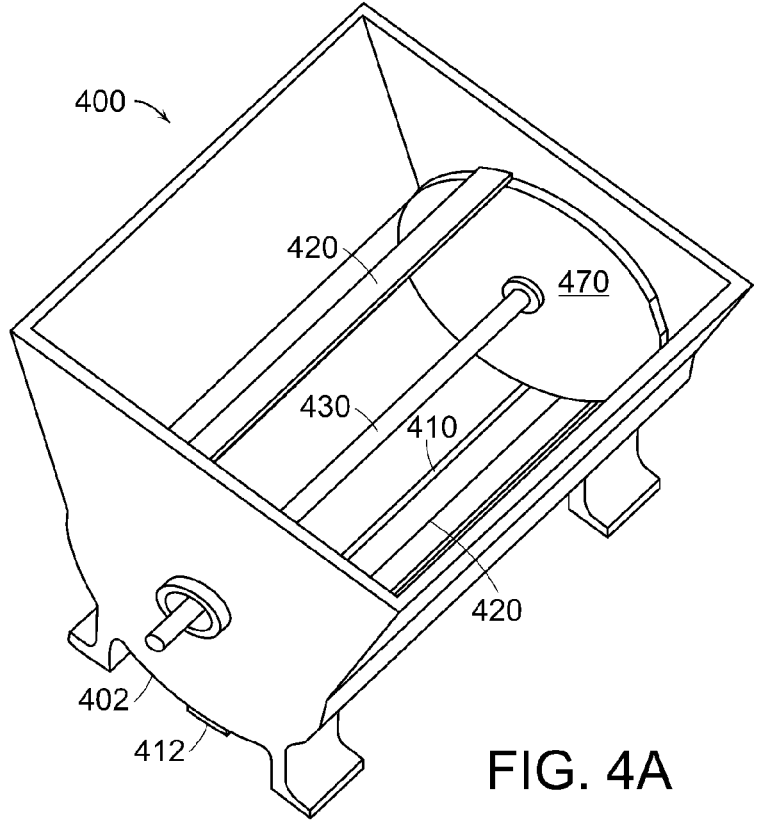
FIG. 4A is a schematic perspective view of a dispensing hopper, in accordance with one embodiment of the invention.

One means of dispensing the powder from the dispensing hopper in the manner required above is shown in FIGS. 4A to 4D. FIG. 4A shows the dispensing hopper 400 for use in 3D printing. In this embodiment, the bottom 402 of the dispensing hopper 400 is substantially the shape of a half cylinder, with the bottom of the half cylinder having a slot 410 through which the powder can be dispensed. The geometry of the dispensing hopper 400 above the cylindrical portion may be shaped in any manner that meets the volume and geometry requirements of the 3D printer and the powder handling system 100. The width of the slot 410 may be manufactured such that the powder, or powders, of interest will not flow freely out of the slot 410, but will rather "bridge" the slot 410 such that a force must be applied to the powder to push it through.

In one embodiment of the invention, one or more blades 420 can be mounted to a shaft 430 co-linear with the centerline of the half cylinder-shaped bottom portion of the dispensing hopper 400. In this embodiment, the powder may be dispensed through the slot 410 by a rotation of the shaft 430 and accompanying blade(s) 420. As the blade 420 is rotated, it enters the half cylinder-shaped bottom portion of the dispensing hopper 400 from above and begins to push powder out the slot 410. Powder continues to exit the slot 410 until the blade 420 passes the slot 410 and begins to move up the half cylinder-shaped wall on the other side, at which time no more powder is released until the next blade 420 approaches the slot 410. Powder flow will also stop when the shaft 430 is not rotating and the blade 420, or blades, are not in motion. In FIG. 4A, the blade assembly 470 incorporates two blades 420, spaced 180° apart around the shaft 430. The shape of the blades 420 and slot 410 depicted are generally elongated, rectangular shapes; however, the size and shape of the blades 420 and slot 410 can vary to suit a particular application. The shaft 430 and blades can be driven by, for example, ¹⁄₂₀ HP motor and gear box.

Figure 4B:
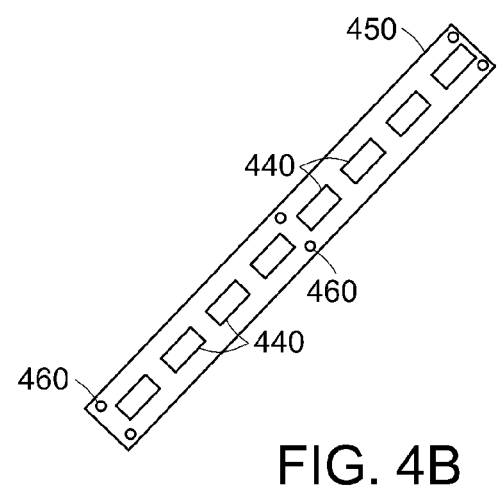
FIG. 4B is a schematic perspective view of a slot plate for use with a dispensing hopper, in accordance with one embodiment of the invention.

The width of the slot 410 can affect the amount of powder that flows from the dispensing hopper 400 and can determine whether powder will free flow when the dispenser apparatus is stationary. The slot 410 can be continuous or interrupted, depending upon the requirements of the 3D printer system. In some embodiments of the invention it may be easier to control width tolerances by using an interrupted slot. In one embodiment, the slot 410 at the bottom of the dispensing hopper may in fact comprise a linear pattern of short slots 440, such as is shown in FIG. 4B. In this embodiment, the slotted portion comprises a separate slot plate 450 that can be attached to the dispensing hopper 400 using releasable mounting hardware 460. As a result, slots of differing widths and configurations can be utilized for different powders or print runs, depending upon the specific requirements of the system. In embodiments with multiple short slot configurations, discrete piles of powder will form under each of the short slots of the dispensing system. These discrete piles will flow into one continuous bead of powder when the spreader roller moves the powder toward the build chamber 110.

In certain embodiments, it may be possible to alter the distribution of the powder by having a non-uniform slot width. For example, more powder can be dispensed at the ends of the slot plate 450 by making the slot wider at the ends. This may be used to compensate for powder that flows around the edges of the powder spreader and falls outside the build chamber 110 during spreading. It can also be used to compensate for boundary effects due to the powder or the dispensing mechanism interacting with the end walls of the dispensing hopper 400. Varying the slot pattern may also be used to adjust the amount of powder dispensed in regions where stiffeners are added to the blade assembly 470 to prevent deflection.

Figure 4C:
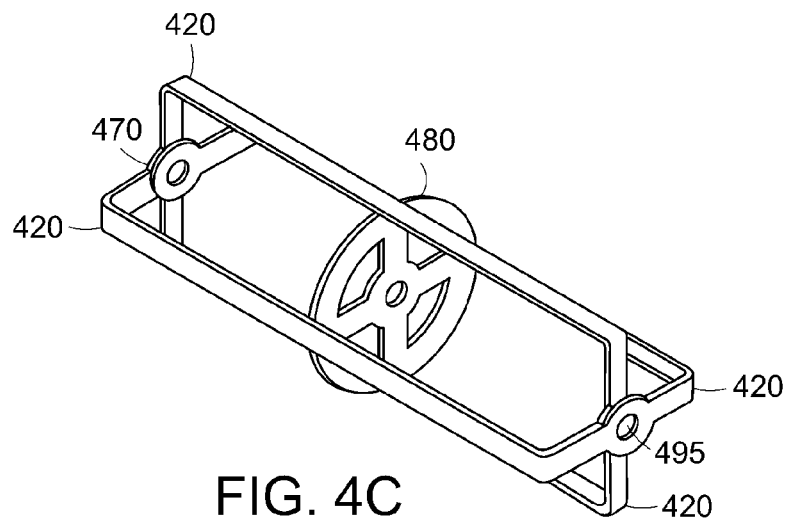
FIG. 4C is a schematic perspective view of a rotating blade arrangement for use in a dispensing hopper, in accordance with one embodiment of the invention.

A blade assembly 470 can be created by mounting one or more blades 420 to the shaft 430. A blade assembly 470 incorporating a stiffening member 480 is shown in FIG. 4C. In this embodiment, the system of blades 420 and the distance between the blades 420 and the half cylinder-shaped portion of the dispensing hopper 400 wall will have a large effect on the amount of powder dispensed, and the shear force applied to the powder during operation. For very small clearances between the wall and the blade 420, the shear force may be relatively high and result in a relatively high amount of powder being dispensed. For larger clearances, the shear force may be lower, as would be the amount of powder dispensed.

This relationship means that the radial tolerances of the blade assembly 470 have a strong effect on the amount of powder dispensed. If the blades 420 are long and thin they can deflect inwards at their middle section, and the amount of powder dispensed near that middle section would therefore be less than the amount dispensed at the ends of the blades 420. Even with no deflection, manufacturing tolerances can affect the repeatability of output from blade to blade. To counteract deflection of the blades, one or more stiffening members 480 can be incorporated into the blade assembly 470. However, although a stiffening member 480 will reduce the deflection of the blades 420, the presence of the stiffening member may disturb the powder and change the amount of powder dispensed in the region of the slot near the stiffening member 480. Again, this effect can be compensated for by varying the width of the slot in that region.

One way to deal with this variation is to design the system so that the blade assembly 470 rotates an integer number ("n") of full rotations in order to dispense a layer worth of powder. Rotating the blade assembly 470 an integer number of times may also compensate for minor differences in the shape, angle, and stiffness of each blade, which may result in a slightly different amount of powder being dispensed by each individual blade. By having each blade pass the slot 410 the same amount of times to dispense a layer worth of powder, this variation in powder dispensed with angular rotation ("theta variability", where theta represents an angle though which the blade assembly 470 rotates) can be eliminated. The blade assembly 470 shown in FIG. 4A, which incorporates two blades 420 spaced 180° apart around the shaft 430, will only dispense powder during two of four 90° segments of a full rotation. During the other two 90° degree segments no powder is dispensed. For this system, either the location of the blades 420 must be known or the system must be turned an integer number of full rotations.

In an alternative embodiment to rotating the blade assembly 470 a fixed number of rotations, the blade assembly 470 can be rotated a fixed angular distance (X°) and then back the same distance. This arrangement provides for the same blade and slot arrangement being used each time, thereby eliminating the variability of different blades.

A system with four blades 420 may be more rotationally independent, in that one blade 420 is always in the "active region," which causes powder to be dispensed from the slot of the dispensing hopper 400 (i.e. in the portion of the half cylinder-shaped region of the dispensing hopper 400 "upstream" of the slot). An example blade assembly 470, with four blades 420 spaced 90° degrees apart around a shaft, is shown in FIG. 4C. In this embodiment, the amount of powder dispensed may vary somewhat depending upon the location of a blade within the "active region" of the dispensing hopper 400. To eliminate this remaining dependency on position, it may be necessary to increase the number of blades or size of the slots further.

In an alternative embodiment, a greater or lesser number of blades 420 may be incorporated into the blade assembly, depending upon the specific requirements of the 3D printer. By increasing the number of blades 420, the frequency of dispensing of powder from the dispensing hopper 400 may be increased. The frequency that powder is dispensed may also be controlled by varying the rotational speed of the shaft 430 and blade assembly 470. In a further alternative embodiment, the shape and pitch of one or more blades may be changed to vary the amount of powder that is dispensed by every passing of a blade.

The rotation of the shaft 430 and blade assembly 470 can be controlled by a motor and gear assembly, or other appropriate means, mounted to the dispensing hopper 400. In one embodiment, this motor and gear assembly may be controlled by the operator, or be connected to the operating system of the 3D printer for automatic activation. As a result, the motor can be turned on and off, and the speed of rotation controlled, in response to user and/or printer control system commands.

In one embodiment of the invention, the width of the slot, or slots, may be able to be varied to increase or decrease the amount of powder being dispensed at one time. The slot may further be closed completely to stop any powder being dispensed. In one example, the slot may automatically close between print runs to stop any powder accidentally falling out and to stop any moisture or other contaminants for entering the dispensing hopper 400. Control of the slot may be achieved manually or by a motor or other appropriate mechanism. The positioning of the slot may, in one embodiment, be controlled by the 3D printer control system. Additionally or alternatively, a cover 412 could be used to close the slots during printing or between print jobs. The cover 412 can be manually positioned and secured in place by, for example, removable fasteners. Alternatively, the cover 412 could be mounted on a track and slidably positioned relative to the slot 410.

Figure 4D:
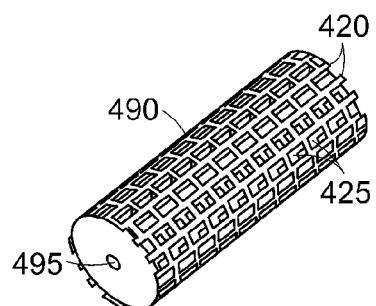
FIG. 4D is a schematic perspective view of an alternative rotating blade arrangement, in accordance with one embodiment of the invention.

The assembly shown in FIG. 4D behaves like a large number of individual blades and decreases the variation due to theta position. In this embodiment, the blade assembly 490 consists of a cylinder with multiple blades 420 and gaps 425 on its circumferential surface. In this embodiment, the cylinder would provide greater hoop strength and deflection resistance, while the large number of blades would provide for a large powder moving capability. In operation, the cylinder blade assembly 490 would dispense powder consistently while it rotates, and would therefore need to be turned on and off at regular intervals to allow the powder to be dispensed discretely as required. The cylinder blade assembly 490 can be mounted to a shaft 430 through holes 495 in the side walls of the cylinder. The shaft can in turn be mounted to a motor, or other appropriate means, to control the rotation of the cylinder blade assembly 490 as required.

Generally, the hopper 400 and associated components can be manufactured from metal and/or polymeric materials. For example, the slot plate 450 and the blades 420 can be stainless steel and the hopper body can be a structural foamed material, such as, for example, polyphenylene oxide. The various components can be manufactured from conventional manufacturing techniques, such as, for example, injection molding, extrusion, stamping, cutting, forming, and welding.

In one embodiment of the invention, the amount of powder dispensed may be dependent on the bulk density of the powder. After the dispensing hopper 400 is filled by pneumatic conveying of powder through the powder handling system 100, the bulk density may be lower due to aeration of the powder. This is similar to the lowering of the bulk density of a powder after it has just been poured out of a container. Under these conditions a larger amount of powder may be dispensed for a few rotations of the blade assembly 470. The motion of the blade assembly 470 through the powder has the effect of locally packing the powder to a consistent density. After a number of rotations of the blade assembly 470, the powder quickly reaches a steady state bulk density and thereafter the amount dispensed will be very consistent.

To avoid this problem during operation, before a print run or after additional powder has been added to the dispensing hopper 400, the slot may be closed off and the blade assembly 470 turned several times prior to a print run in order to achieve a steady state bulk density prior to operation. In this embodiment, no powder would be dispensed until the bulk density of the powder reaches its steady state, after which the slot could be opened and normal operation resumed.

In one embodiment of the invention, a diffuser and filter system 500 can be mounted onto the dispensing hopper 400 to provide the powder handling system 100 with a pneumatic means of drawing powder into the dispensing hopper 400 from one or more remote locations. In this embodiment, powder may be entrained into the dispensing hopper 400 through an inlet port 510 on the side of the dispensing hopper 400. The air and powder entering through the port 510 may be passed through a diffuser 520 to reduce the velocity of the air and powder entering the dispensing hopper 400 to minimize damage to the filter system and hopper 400, and minimize the disturbance to the packed powder in the hopper 400.

The filter assembly 500 can be mounted on top of the dispensing hopper 400 via a frame 505, with an air path through a filter 530 leading to the vacuum source 150, which provides the negative pressure in the powder handling system 100. The filter 530 prevents any powder from leaving the dispensing hopper 400 and passing through the vacuum source 150 and out into the atmosphere.

The air entering the dispensing hopper 400 may be traveling at high velocity. Many powders used for 3D printing are highly abrasive. If high velocity air with entrained abrasive powder impinges on the filter 530 it may erode the filter media. In one embodiment of the invention a HEPA filter ('High Efficiency Particulate Air' Filter) may be utilized. Many HEPA filters have an expanded PTFE (Polytetrafluoroethylene) membrane as an outer layer, for example, Tetratex® 6277 available from the Donaldson Company, Inc. This may increase the efficiency of the filter, especially in the micron and sub micron range, and makes it easier to clean, but the PTFE layer is soft and prone to damage. Some powders used in 3D printing may pack very densely so that the packed mass is not very air permeable. When these types of powders are vacuumed into the dispensing hopper 400 they can form a cake on the filter, increasing the pressure drop across the filter and decreasing the pressure differential available to convey powder. In practice, it has been found that a minute or two is sufficient to build a cake on the filter that prevents additional powder from being conveyed into the feeder.

Figure 5A:
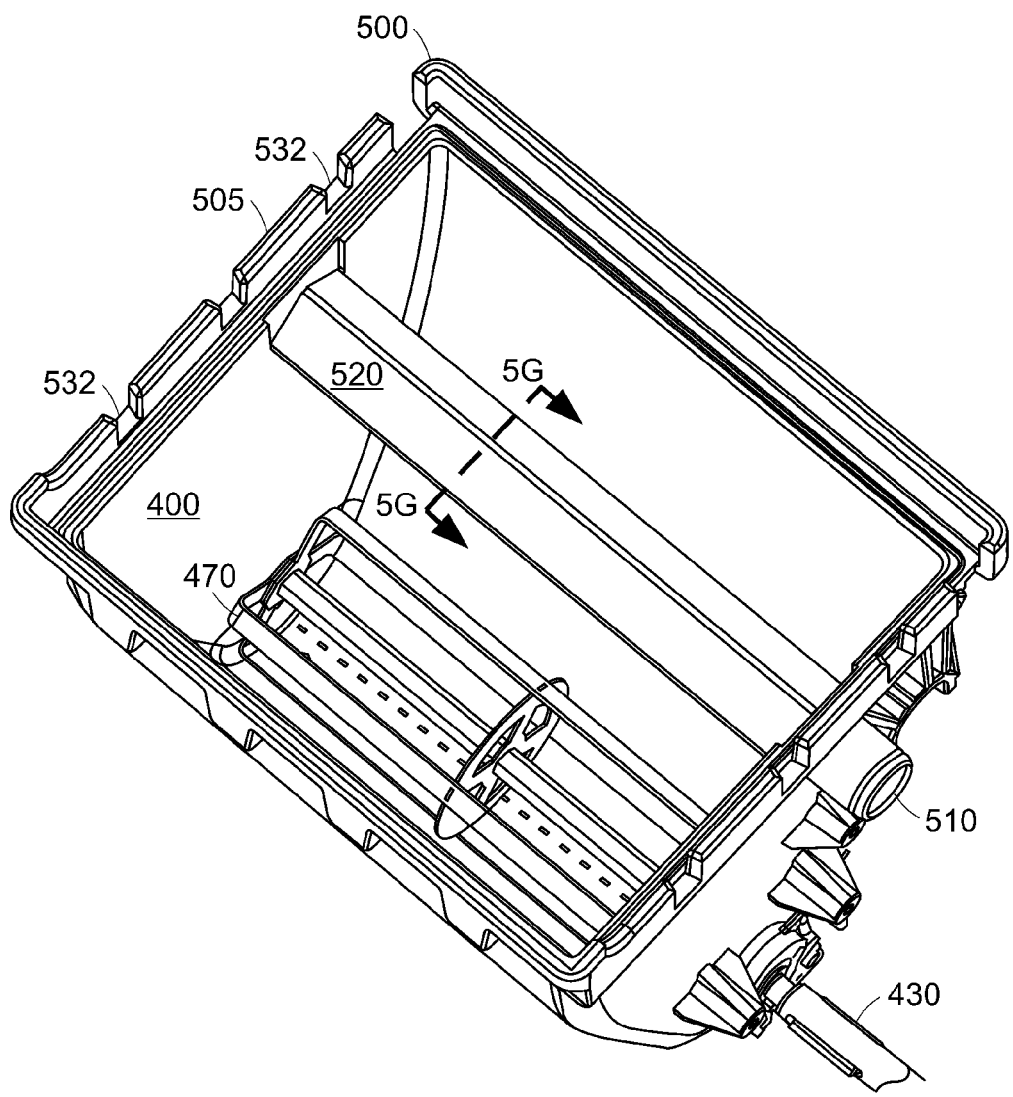
FIG. 5A is a schematic perspective view of a dispensing hopper with internal diffuser, in accordance with one embodiment of the invention.

The problem of filter abrasion due to impinging air entrained powder can be solved by causing the air entering the dispensing hopper 400 to pass through a baffle or diffuser 520 (see FIGS. 5F and 5G) that has the effect of slowing the air and increasing the volume over which the powder and air enter the remainder of the dispensing hopper 400. One embodiment of a diffuser 520 placed in a dispensing hopper 400 is shown in FIG. 5A. In this embodiment, the diffuser 520 consists of a tubular body with a large number of small holes 524 in the wall of the tube. In one embodiment of the invention the tube material may be an abrasion resistant material, such as a hard metal, to minimize damage to the diffuser 520 during use.

Generally, the shape and orientation of the tube is such that powder falling off the filter 530 will not accumulate on the top surface of the diffuser 520. In this embodiment, the top side 526 of the diffuser 520 is wedge shaped, allowing any powder falling from the filter 530 to slide off the diffuser and fall into the lower portion of the dispensing hopper 400. The diffuser 520 may be manufactured from perforated sheet steel (e.g., by folding), or any other appropriate material. In this embodiment, perforations are only placed on the lower portion 522 of the diffuser 520, directing the incoming air and powder towards the lower portion of the dispensing hopper 400. In alternative embodiments, the perforations may be placed on all sides of the diffuser 520, or only on the top side 526 of the diffuser 520. The diffuser may be diamond shaped, cylindrical, wedge shaped, a combination of these shapes (e.g. wedge shaped on top and cylindrical on the bottom), or any other appropriate shape. In a further alternative embodiment, the diffuser may be an inverted V shape, allowing the powder to fall freely towards the lower portion of the dispensing hopper 400 while preventing it from directly impinging upon the filter 530.

In one embodiment of the invention, the problem of powder caking onto and blocking the filter 530 can be solved by regularly cleaning the filter 530. One skilled in the art will recognize that there are several methods of cleaning the filter when there is no pressure drop across it, such as when the vacuum source 150 is turned off. However, because the powder cake may build up fast, it is desirable to be able to clean the filter 530 while the vacuum source 150 is turned on, without significantly affecting the powder conveying function of the powder handling system 100.

Figure 5B:
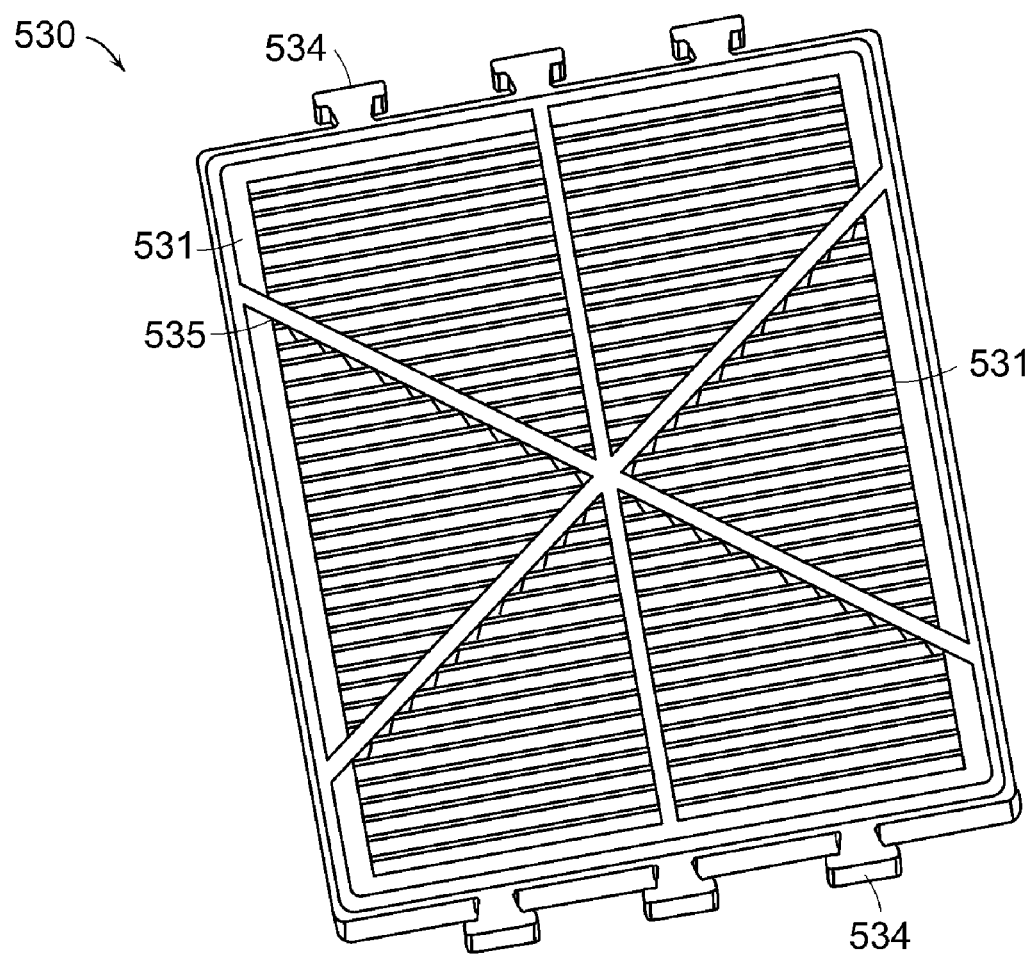
FIG. 5B is a schematic perspective view of a segmented powder filter for placement on a dispensing hopper, in accordance with one embodiment of the invention.

In one embodiment of the invention, the filter 530 can be segmented into two or more independent segments 531. An example of a segmented filter 530, in this case with six separate segments 531, can be seen in FIG. 5B. Here, the segmentation of the filter 530 may be accomplished by molding an elastomer frame 535 over the filter media. The elastomer (e.g., silicone) can bond to the filter media, thus pneumatically isolating each segment. The elastomer can also serve as a gasket to seal each filter segment to a matching plenum segment, allowing the air flow to each segment to be controlled individually. In this embodiment, the segments 531 are arranged in a radial pattern, although in other embodiments of the invention any arrangement of segments 531 may be envisioned. The filter 530 shown in FIG. 5B is a pleated filter media, although a non-pleated media may also be used. In one embodiment the "dirty" side of the filter 530 may include an expanded PTFE membrane on the filter media, although this is not necessary. It should be noted that, if required, two or more filters may be used to filter the air leaving the dispensing hopper 400. In one embodiment, the filter 530 connects to the frame 505 via interlocking structures 532, 534. In addition, a seal may be included between the filter 530 and frame 505 to prevent air from entering the hopper from around the filter assembly 500.

By splitting the filter 530 into a number of separate segments 531, the airflow may be controlled through each segment. As a result, the majority of the segments can be set to filter the air flowing to the vacuum source 150, while one or more other segments 531 may be exposed to a reversed airflow, in order to remove powder from and, therefore, clean that filter segment. In this embodiment, a plenum placed over the "clean" side of the segmented filter 530 is also divided into separate segments 533, with valves controlling the airflow through each segment of the plenum separately. In one embodiment of the invention, the number of segments is chosen so that the decrease in available filter area is small enough not to significantly affect the performance of the powder handling system 100 when one segment is being cleaned. The tradeoff to a very large number of segments is cost and the filter area lost to the material used to create a segment boundary.

In this embodiment, air can continue to flow from the dispensing hopper 400 through a number of the segments of the filter 530 and onwards through the plenum to the vacuum source 150. Valves in the plenum may isolate one or more filter segments from the airflow, and instead expose the "clean" side of the filter to higher pressure air, such as from the atmosphere or other pressure source. This higher pressure air may be at the ambient pressure of the surrounding atmosphere, or be at any positive pressure (i.e., any pressure greater than that within the powder handling system 100). This positive/higher pressure may be created by simply opening a valve to the atmosphere, or by opening a valve to a separate air flow source. As the higher pressure air will be at a greater pressure than the air within the dispensing hopper 400, the air flow will be reversed and will flow from the clean side to the dirty side of the filter. Air flowing from the ambient air through the one or more isolated segments 531 of the filter 530, from the clean side to the dirty side, will cause powder to drop off this segment, thus cleaning the segment of the filter.

Figure 5C:
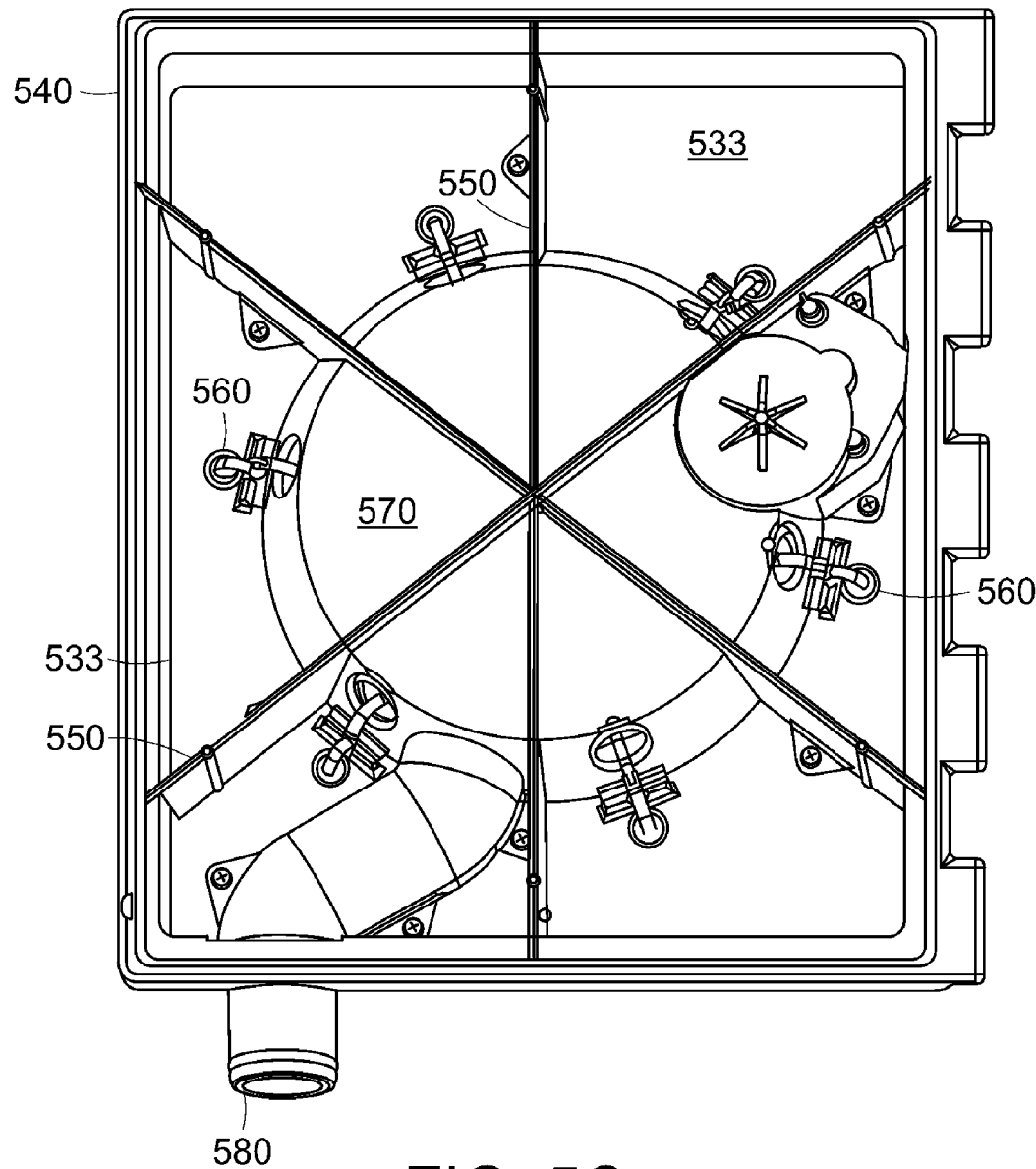
FIG. 5C is a schematic perspective view of a segmented plenum for a segmented powder filter, in accordance with one embodiment of the invention.

One example of a plenum placed over the "clean" side of a segmented filter 530 can be seen in FIG. 5C. In this embodiment the plenum 540 is divided into six portions or segments 533, corresponding to the six filter segments 531 of the filter 530 shown in FIG. 5B. Ribs 550 divide the plenum 540 into segments and seal the elastomeric segment boundaries between each portion of the filter 530. Each plenum segment 533 includes a valve assembly 560 that allows the plenum segment to be opened to either the air path from the vacuum source 150, or the higher pressure air in the surrounding environment. The plenum segments are opened to the air path from the vacuum source 150 through a separate central plenum 570 that is attached to an outlet port 580 leading to an air path, such as an air hose, leading to the vacuum source 150. In one embodiment, the plenum is manufactured from a structural foam, such as Noryl® FN215X, a polyphenylene ether and polystyrene blend, available from the GE Company. The ribs 550 can be manufactured from a polyphenylene ether and polystyrene blend, such as Noryl® GFN1, also available from GE. The valve and its associated components can be manufactured from acetal with reinforcement, such as 10% aramid fibers and 15% PTFE.

In one embodiment of the invention, the segments are radial so that the valve assemblies 560 can be actuated by a rotary motion, which may be less expensive to implement than other possible systems. In this embodiment, the valve assembly 560 includes two valves in each plenum segment that are attached to the same valve stem and are actuated simultaneously by one mechanism. When the valve is opened to the environment and, therefore, closed to the central plenum 570 and outlet port 580, the pressure difference between the environment and the dispensing hopper 400 will force the air to flow into the plenum, through the filter segment from the clean side to the dirty side, and then back up through another filter segment connected to the vacuum source 150.

When both valves are open, air can flow directly from the environment to the vacuum source 150 without passing through the filter 530. This air path becomes the lowest impedance path to the vacuum source 150. If this was to occur, the pressure and flow available to move powder would drop to nearly zero. One way to eliminate this possibility is to close one valve before opening the other. In embodiments where the two valves are a single part and/or where they are actuated simultaneously, it is important that the two valves in each segment not be open simultaneously for any significant amount of time. It may, therefore, be necessary to cause the valves to change state very rapidly to avoid a drop in differential pressure in the powder handling system 100.

Figure 5D:
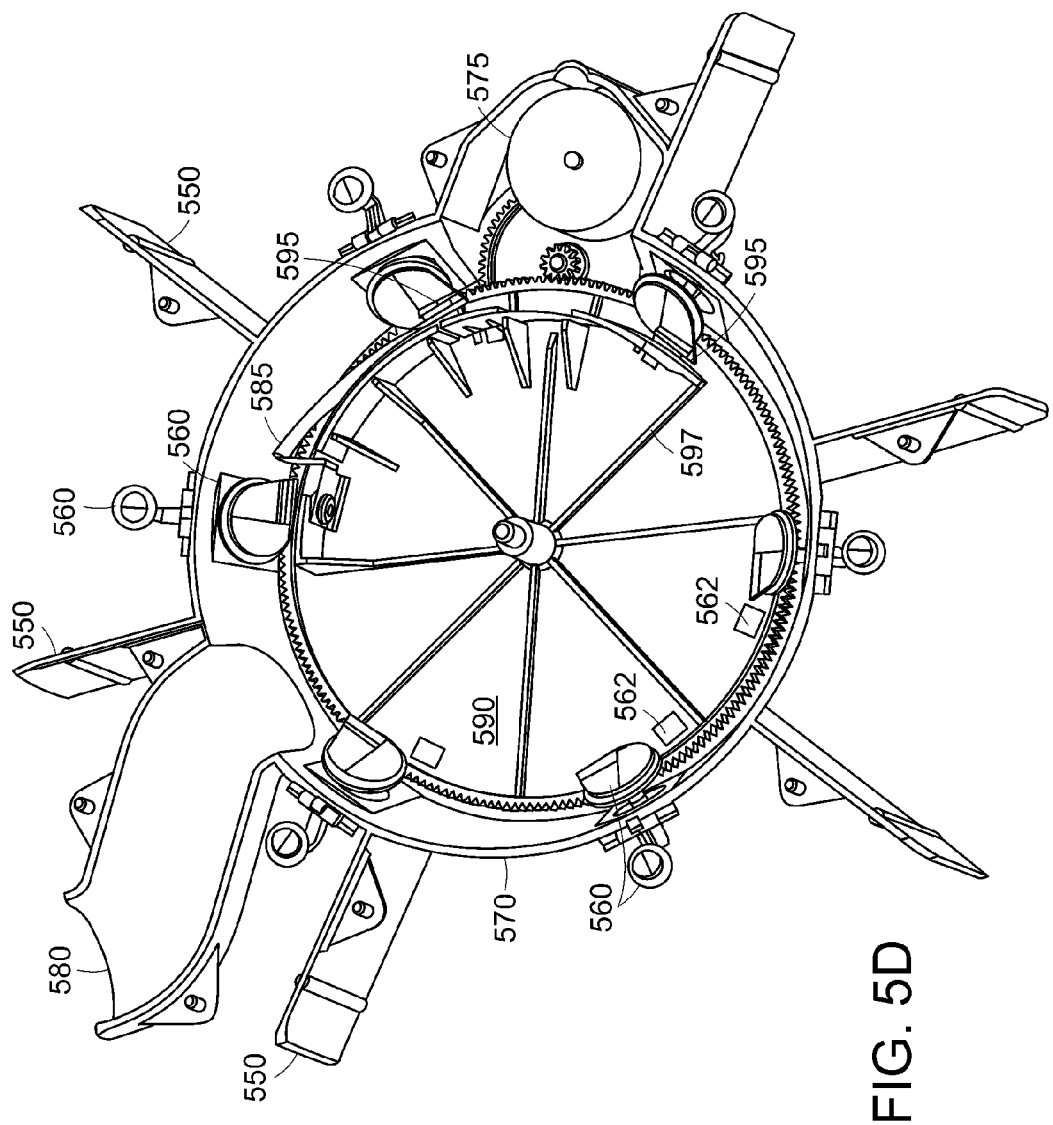
FIG. 5D is a schematic perspective view of an actuation method for the segmented plenum of FIG. 5C.

One means of opening and closing the valves is shown in FIGS. 5D and 5E. In this embodiment, a spring cam 585 is mounted to a gear assembly 590 that is coupled to a motor 575. In one embodiment, the motor is a Portescap™ #42M048C-N stepper motor available from Danaher Motion. As the motor 575 rotates the gear assembly 590, the cam 585 comes into contact with each of the valve assemblies 560 in turn via the cam followers 595. The cam 585 then actuates the valve assemblies 560 in turn, by switching them from one state to another (i.e., from open to the central plenum 570 and closed to the environment to closed to the central plenum 570 and open to the environment, and vice versa). Once the cam 585 has passed the valve assembly the valve returns to its original state either through the force exerted by a valve spring or the pressure differential acting across the valve. In one embodiment, ribs 597 to each plenum segment depress the spring cam 585 as it turns. In an alternative embodiment, the plenum separating ribs 550 may be used to provide the actuation of the spring cam 585. When the cam 585 is rotated past a rib 597 it falls off the rib 597 and rapidly returns to its undeflected position. As it does, it contacts a cam follower 595 on the valve and causes the valve to change state. As a result, the cam 585 and cam follower 595 open and close each valve as the motor 575 and gear assembly 590 drive the cam 585 in a circular motion around the plenum 540. In an alternative embodiment, multiple cams 585 may be mounted on the gear assembly 590 to allow more than one filter segment to be cleaned at one time.

In a further alternative embodiment, each valve assembly 560 can have its own actuation means, such that any individual valve can be opened or closed at any time in response to a signal from a controller. In this embodiment, the filter segments need not be closed and opened in a specific sequence, but could rather be opened and closed for cleaning in any order or at any time. For example, a pressure sensor 562, or other appropriate sensing means, could be included in each segment that could sense when a particular portion of the filter 530 is becoming clogged. A filter controller could then actuate the valves in that portion to clean that region of the filter 530 immediately.

In a further alternative embodiment, the valve and gear assemblies could be replaced with a rotating disc with holes or slots at set locations. As the disc turns, these holes could match up with holes or slots in the plenum, which open a segment of the plenum to either the atmosphere or the central plenum 570 for a given period. By offsetting the holes, the disc can be arranged to cover and seal one hole before the other is exposed, meaning that a given segment is never opened to both the atmosphere and vacuum source 150 at any one time.

One embodiment of the invention includes a valve to allow the source of the air flow in the powder handling system 100 to be changed. As a result, powder can flow towards the dispensing hopper 400 from a number of different sources, as required.

Figure 6A:
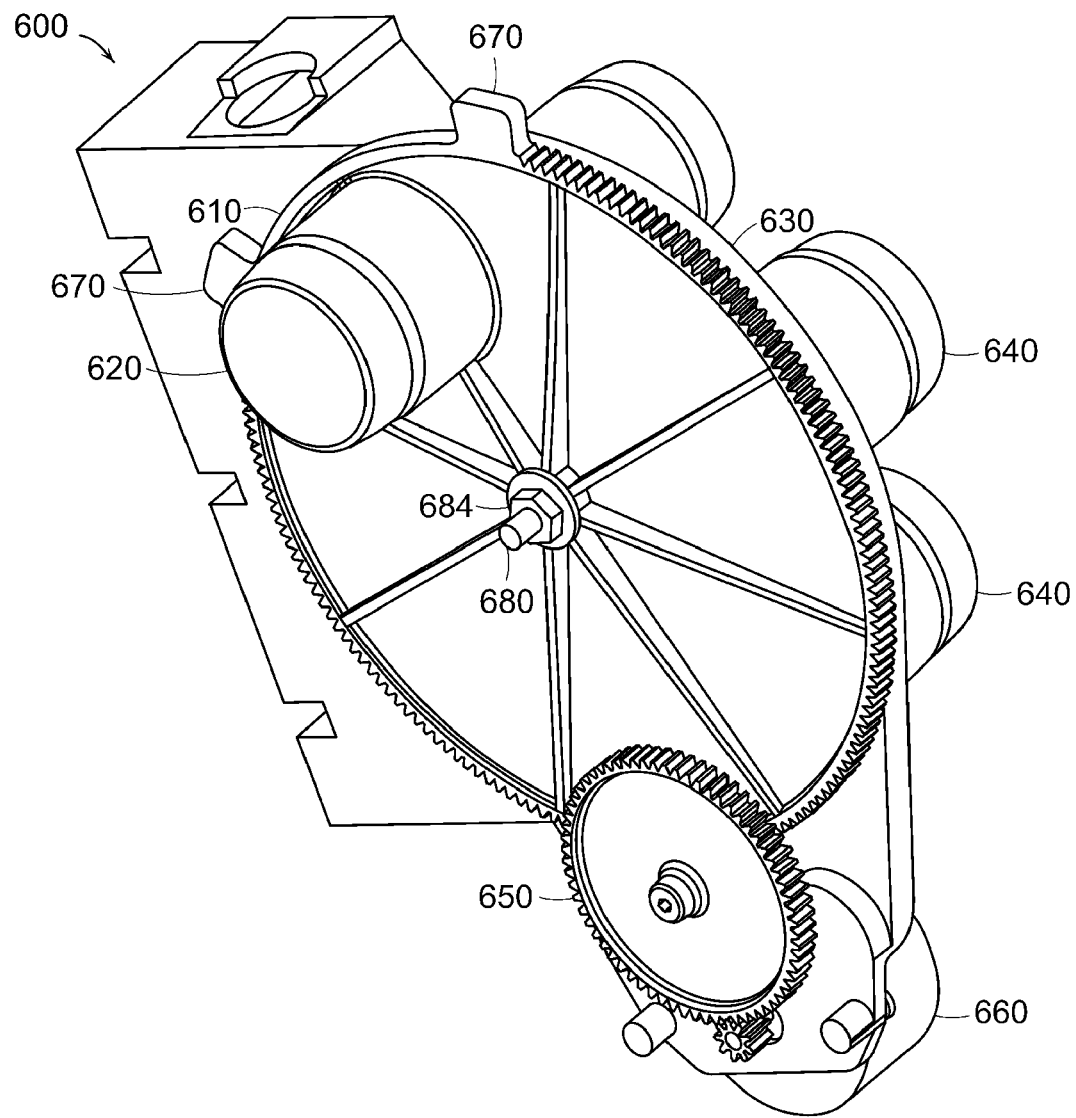
FIG. 6A is a schematic perspective view of a valve assembly for a powder handling system, in accordance with one embodiment of the invention.
Figure 6B:
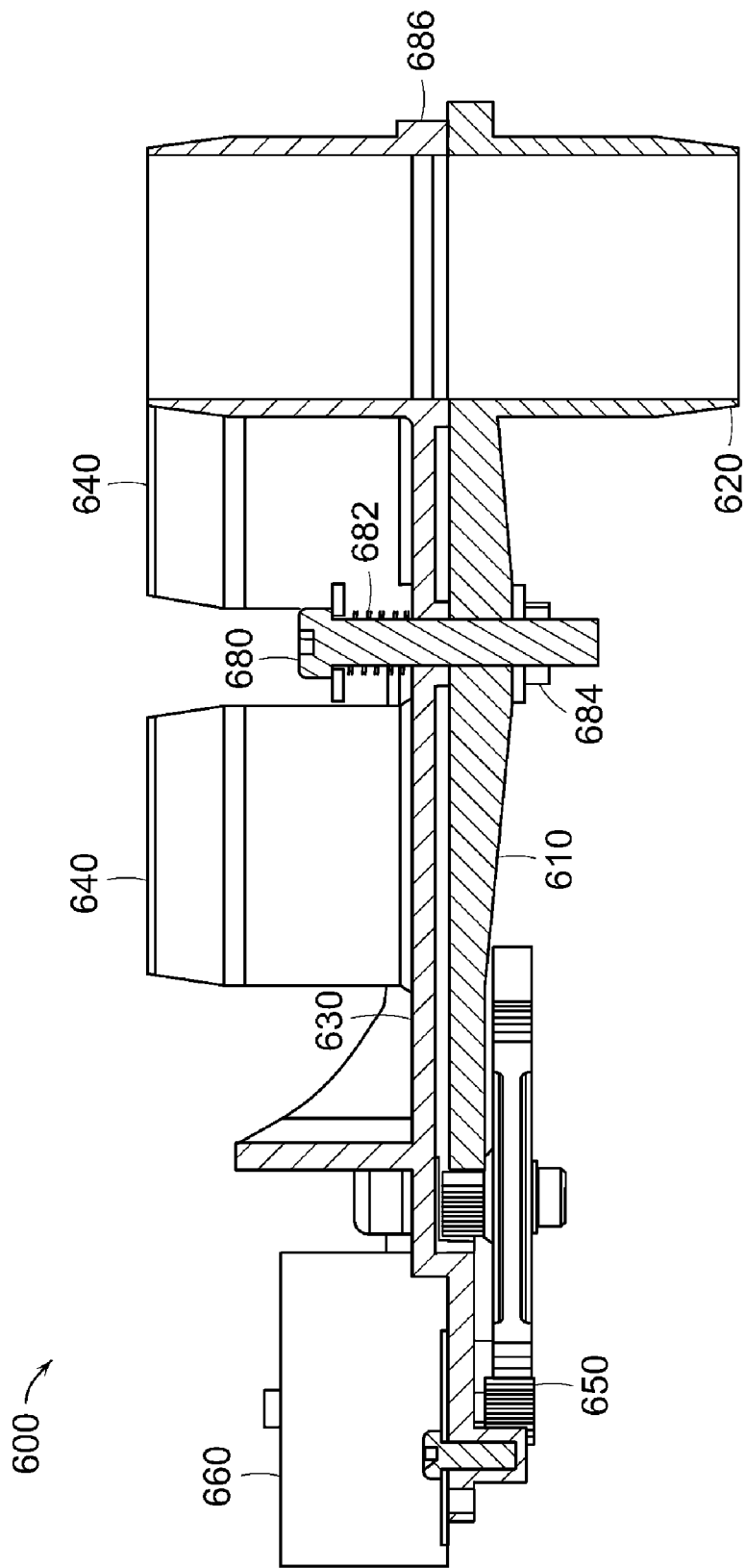
FIG. 6B is a schematic side view of the valve assembly of FIG. 6A.

In one embodiment, the valve can consist of two plates that can be rotated relative to each other. An example of a multi-port valve 600 can be seen in FIGS. 6A and 6B. In this embodiment, a first plate 610 may include a single port 620 that may be connected through an air hose to the dispensing hopper 400 and vacuum source 150. A second plate 630 may include multiple ports 640, allowing this plate to be coupled to a number of different sources of powder, including, but not limited to, a build chamber, an overflow chamber, a vent, a depowderer, and a powder container. In an alternative embodiment, both the first plate 610 and the second plate 630 may include multiple ports, allowing for multiple air flow passageways between different locations within the powder handling system 100. In one embodiment, the valve components are manufactured from a static dissipative acetal filled with 10% PTFE.

In one embodiment, the first plate 610 is coupled to a gear train 650 and motor 660, allowing the first plate to be rotated with respect to the stationary second plate 630. The first plate 610 can have gear teeth formed along its outer circumference for engaging the gear train 650. The motor 660 can also be the aforementioned Portescap™ motor. By rotating the first plate 610 with respect to the second plate 630, the port 620 may be lined up with any of the ports 640 on the second plate 630. As a result, the air flow can be towards the vacuum source 150 from any of the sources of powder, allowing powder to be drawn into the dispensing hopper 400 from any location, as required by the 3D printer.

One advantage of the system is that the use of the vacuum source 150 means that the seal between the two plates need not be perfect. As the powder stream is at a negative pressure relative to the atmosphere around the valve 600, then powder will not leak from a less than perfect seal between the two plates. This can allow a lower spring force and a smaller motor to overcome the friction of the seal.

In an alternative embodiment, the second plate 630 may be rotatable with the first plate 610 stationary, or both plates may be rotatable. The rotation of the plates with respect to each other may be accomplished by any appropriate means. In the embodiment shown in FIGS. 6A and 6B, the stepper motor 660 and gear train 650 are positioned on the periphery of the moving plate. In this embodiment, tabs 670 limit and control the rotation of the moving first plate 610 with respect to the stationary second plate 630. This may allow the system to be re-zeroed at any time, by rotating the first plate 610 until a stop is reached. The tabs may also be used to limit the motion of the plates to one rotation or less, to avoid any possible twisting of the hose, or hoses, due to multiple rotations. In addition, virtual stops programmed into the motor controller, or stops in the motor 660 itself, may be used to limit the rotation of the plates with respect to each other.

The two plates may be held together by a centrally located springed shoulder screw 680 and nut 684. This allows rotary motion while still providing a normal force (via spring 682) to seal the two plates together. A raised boss 686 around each port on the stationary plate can produce a seal with the moving plate by concentrating the pressure due to the spring force from the shoulder screw in a limited area. Any other appropriate means of holding the plates together, either centrally or at their edges, may also be utilized.

In one embodiment of the invention, the moving first plate 610 may be rotated to line up with a solid area of the stationary second plate 630, allowing the air flow to be terminated, if required. It should be noted that the direction of flow is not important to the valve and the vacuum source may be plumbed to either the moving or stationary plate. Furthermore, in certain embodiments, an air mover may be placed upstream of the valve in a pressurized system.

Another challenge of 3D printing is keeping the print heads clean during and between print runs, while also keeping the binder fluid from drying or gelling in the print head nozzles when the 3D printer is idle. Dried or gelled binder can clog the nozzles and prevent the print head from firing properly. The second problem is addressed by bringing the print heads into contact with caps at the end of a print job and leaving them capped while the printer is idle. The caps are designed to eliminate air flow around the nozzles and therefore slow the rate of drying of the binder.

Unfortunately, in existing 3D printers, the first problem is often exacerbated by the solution to the second problem. During printing, dust is stirred up by the action of spreading powder and printing with it. Some of this dust will settle on the caps. Thus, when the print head is capped the dust that has settled on the caps can contaminate the face and the nozzle plate of the print head.

Figure 7A:
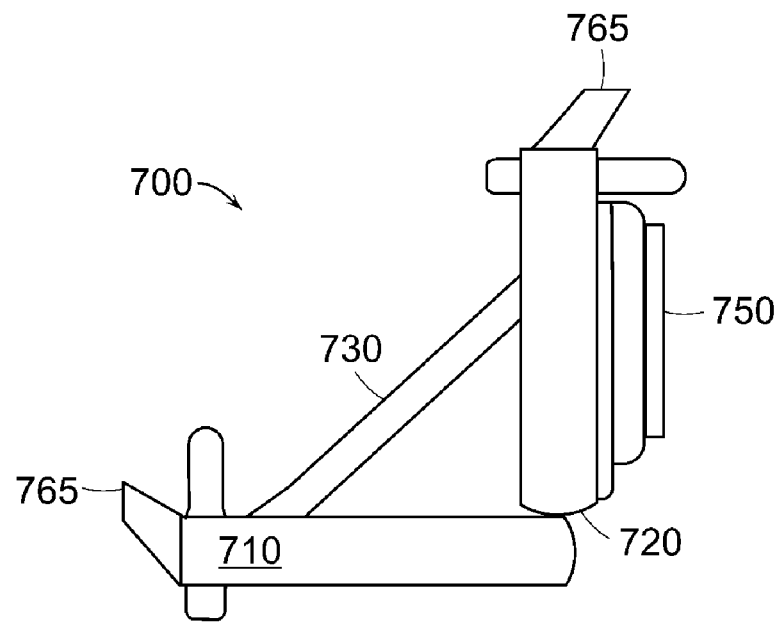
FIG. 7A is a schematic side view of a cap assembly in a vertical storage position, in accordance with one embodiment of the invention.
Figure 7B:
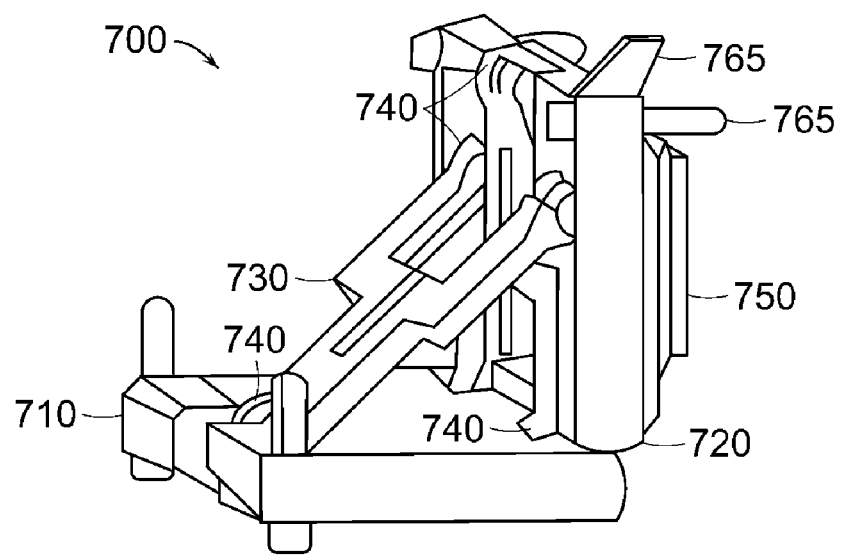
FIG. 7B is a schematic perspective view of the cap assembly of FIG. 7A.
Figure 7C:
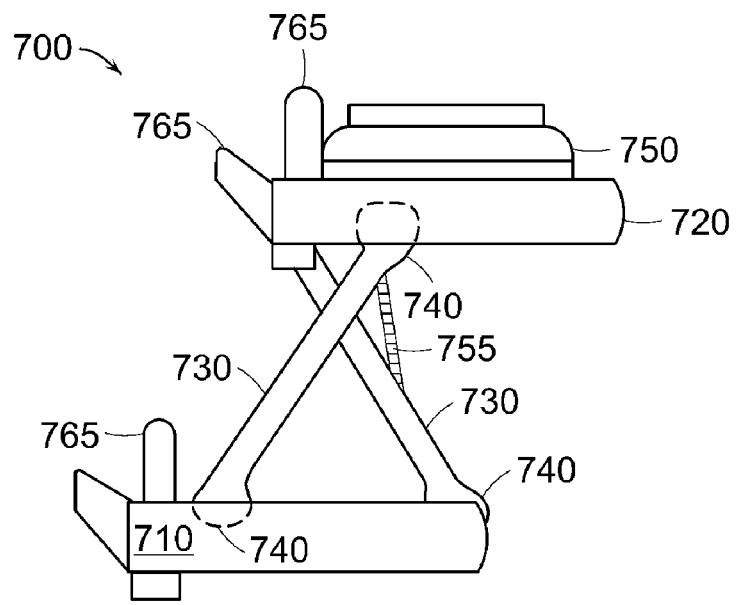
FIG. 7C is a schematic side view of the cap assembly of FIG. 7A in a horizontal capping position, in accordance with one embodiment of the invention.
Figure 7D:
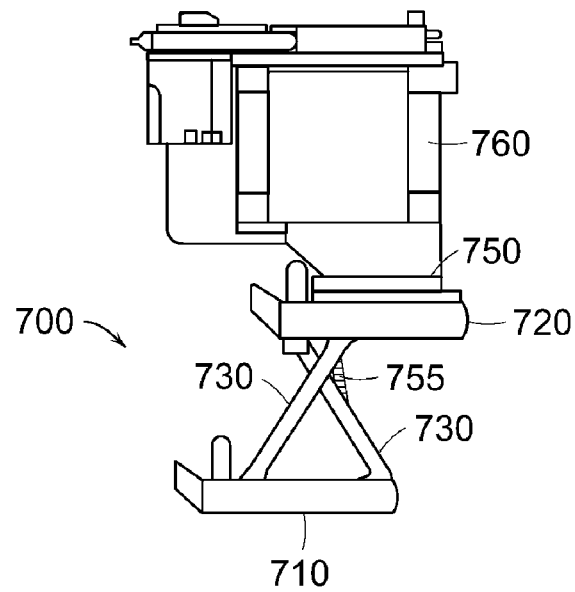
FIG. 7D is a schematic side view of the cap assembly of FIG. 7C in contact with a printhead, in accordance with one embodiment of the invention.

In one embodiment of the invention, the problem of getting dust on the caps is alleviated by storing the caps in a vertical position when they are not in use. Thus, the working surfaces of the caps are partially protected from dust, as the vertically aligned caps will be less prone to being covered by dust. One embodiment of this invention can be seen in FIGS. 7A to 7D. This cap assembly 700 includes a base 710 and a cap support 720, with a pair of linkage arms 730 coupling them about pivot points 740. The print head cap 750, or caps, is mounted on the cap support 720 and is, therefore, able to move from a vertically aligned storage position, as shown in FIGS. 7A and 7B, to a horizontally aligned capping position, as shown in FIGS. 7C and 7D. A spring 755, connecting the pair of linkage arms 730, biases the cap assembly 700 in its vertically aligned storage position. The various components of the capping station can be manufactured from acetal filled with 15% PTFE and 10% aramid fibers, for example.

In operation, when the print head 760 is to be capped, the print head carriage will move to the cap assembly 700 and engage an actuator tab 765 on the cap support 720. The tab 765 may be contacted by either the print head 760 or the carriage. As the print head carriage moves horizontally, it forces the cap support 720 to pivot about the pivot point 740 and move from its vertically aligned storage position to its horizontally aligned capping position. As the cap assembly 700 approaches its capping position, the caps 750 will abut the print head 760, or print heads, and provide a seal for the print heads 760, thus eliminating the air flow around the nozzles and, therefore, slowing the rate of drying of the binder.

When the print head 760 is ready for use, the carriage will move horizontally away from the cap assembly 700, releasing the pressure on the actuator tabs 765, and allowing the cap assembly 700 to return to its vertically aligned storage position. The spring 755 provides a restoring force that biases the cap assembly 700 in its vertically aligned storage position when not engaged by the print head carriage. As a result, the cap assembly 700 is only positioned in the horizontally aligned capping position when the print head and/or carriage has engaged the actuator tabs 765 and the print head is in contact with the cap 750.

In this embodiment, a four bar linkage is used to move the print head caps between a horizontal orientation (when capping the print heads) and a vertical orientation (for storage). It should be noted that the four bar linkage is only one means of moving the caps between the vertical and horizontal orientations, with any other appropriate means of operation also envisioned. The cap assembly 700 moves from a vertical alignment to a horizontal alignment upon engagement by a print head and/or carriage, and then returns to a vertical alignment upon release. In an alternative embodiment, any appropriate mechanical and/or hydraulic means, including, but not limited to, gear assemblies, springs, pivot arms, flexible members, and/or pistons, may also be used to provide the appropriate pivoting motion and restoring force to the cap assembly 700. In a further alternative embodiment, the restoring force is provided by the print head carriage, as it moves away from the cap assembly 700, so no restoring spring force is required within the cap assembly 700 itself.

Another problem with inkjet printers is that when the print head is capped the design of the cap can cause a pressure spike at the nozzle. This pressure spike may cause the print head to ingest air and cause de-priming of the nozzles or shorten the life of the print heads. A standard solution to this problem in paper printers is to create a vent hole in the cap to prevent the pressure spike. However, in 3D printing this vent hole may become another avenue for contamination by the powder.

Figure 7E:
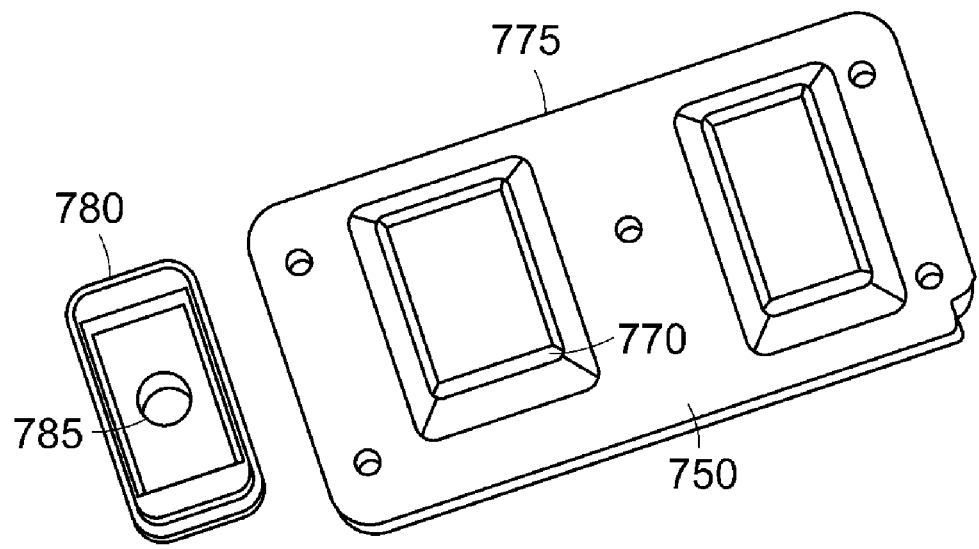
FIG. 7E is a schematic perspective view of a standard printer cap compared to a printer cap for the cap assembly of FIG. 7A, in accordance with one embodiment of the invention.
Figure 7F:
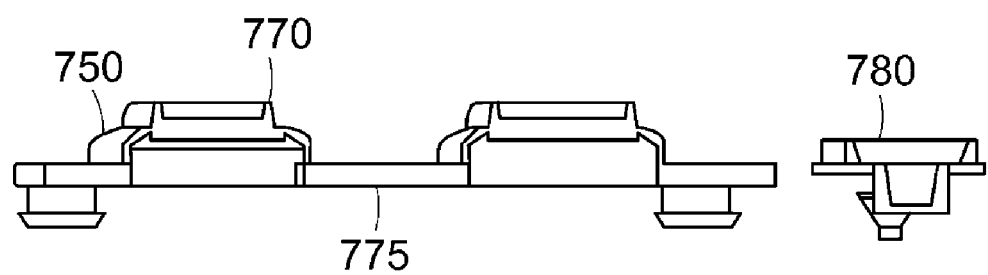
FIG. 7F is a schematic side view of the standard printer cap and the printer cap for the cap assembly of FIG. 7A, as shown in FIG. 7E.

One embodiment of the invention includes a print head cap that does not require a vent hole. Instead, the cap incorporates a large amount of vertical compliance, thus providing a complete seal, without an avenue for powder contamination, while avoiding the problem of possible pressure spikes during capping. An example of this embodiment, along with an example of a standard cap including a vent hole, can be seen in FIGS. 7E and 7F.

In this embodiment, the print head cap 750 includes one or more sealing surface 770 (in this case two sealing surfaces) mounted on a mounting plate 775. Compliance is provided by the cap material and the geometry of the mounting plate 775, providing a spring type mount for the sealing surface 770. A standard cap 780 with a vent hole 785 is shown beside the compliant print head cap 750 for comparison.

In one embodiment of the invention, the sealing surface 770 and/or mounting plate 775 of the compliant cap 750 is formed from a rubber, foam or other appropriate compliant material, for example, silicone with a 30 Shore A hardness. In an alternative embodiment, compliance can be provided by mounting the cap on a spring arrangement, providing the cap with a certain amount of "give" when abutted by the print head. In a further alternative embodiment, the cap can include both a compliant material and a spring mounting.

3D printers generate liquid waste during normal operation. There may be up to three sources of this waste depending on the design of the 3D printer. Some 3D printers use off the shelf thermal inkjet printheads that include a small quantity of ink. When a new printhead is installed, the printhead is fired into the printer's waste collector unit 800 until the ink has been replaced with binder. Many 3D printers fire the printhead into the waste collector unit 800 while printing, and occasionally when idle, as part of the process of keeping the printhead clean and operating properly. Some 3D printers may also have a wash fluid which is used to clean the printhead or wipers that clean the printhead. All of these fluids (e.g., ink, binder, and wash fluid) make up the liquid waste stream of the 3D printer. The waste is mostly water, but also includes volatile and non-volatile components which may include surfactants, humectants, colorants, preservatives, and other ingredients. Current practice is to channel all of this liquid into a container, bottle or jug, which the user has to empty from time to time.

In one embodiment of the invention, the liquid waste may be channeled into a reservoir where it can be turned into a solid. Here, the liquid may be absorbed with an absorbent medium while letting the volatile components (mostly water) evaporate. As a result, there is no need for a user to regularly empty a liquid container. Instead, the water is evaporated away and the remaining waste is stored as a solid and need only be removed very infrequently. Example waste collector units 800 are shown in FIGS. 8A and 8B.

Figure 8A:
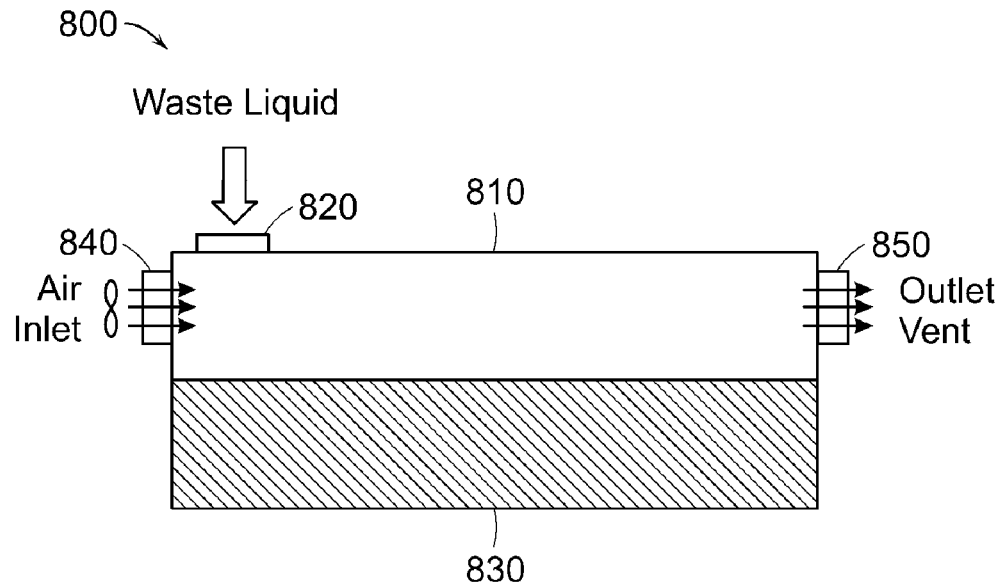
FIG. 8A is a schematic side view of a waste collector unit with a horizontally placed absorptive medium, in accordance with one embodiment of the invention.

In the embodiment of FIG. 8A, waste liquid enters a reservoir 810 through an inlet port 820. The waste liquid is then absorbed by an absorptive medium 830 placed in the bottom of the reservoir 810. In one embodiment, the reservoir is a DPA24 drip pan available from Sorbent Products Company. The absorptive medium can be a hydrogel material made of a hydrophilic polymer and a fibrous material. Examples of hydrophilic polymers include sodium acrylate, potassium acrylate, or an alkyl acrylate and the fibrous material can include wood pulp.

Air may then be blown from a fan 840 into the reservoir 810, and exit the reservoir through an outlet vent 850. As the air travels through the reservoir 810, it passes across the top of the absorptive medium 830 and helps increase the rate of evaporation of the liquid waste. The evaporated liquid (mainly water vapor) may then leave the reservoir through the outlet vent 850, leaving only the solid waste matter in the absorptive medium 830. In one embodiment, this air may be warm to further increase the rate of evaporation. In another possible embodiment, the air may be the exhaust from the vacuum source 150 of the powder handling system 100. In this embodiment, the air may be warm due to the work done on it by the vacuum source 150. Here, the air flow is created automatically as a free by-product of the action of the blower. In a further alternative embodiment, an absorptive medium 830 may not be required, with the solid waste free to collect loosely in the bottom of the reservoir 810 as the water evaporates.

Figure 8B:
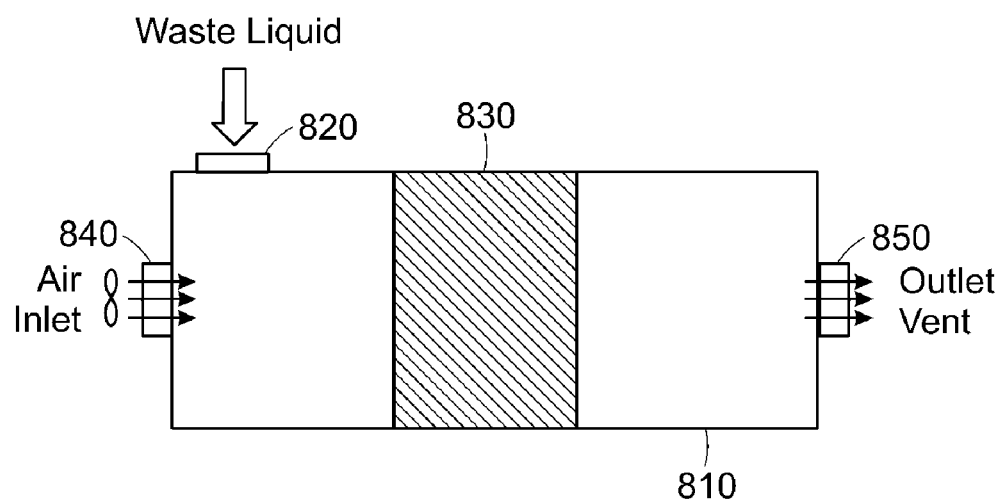
FIG. 8B is a schematic side view of a waste collector unit with a vertically placed absorptive medium, in accordance with one embodiment of the invention.

In an alternative embodiment, as shown in FIG. 8B, air is blown at an absorptive medium 830 placed across the central portion of the reservoir 810 to increase the rate of evaporation. Here, the air will pass through the absorptive medium 830, evaporating any liquid waste, and exit through the outlet vent 850, leaving only the solid waste held within the absorptive medium 830.

The above mentioned embodiments have several advantages. The frequency of emptying the reservoir is vastly reduced, because only the non-volatile components of the waste stream remain in the reservoir. In addition, the reservoir, absorbent, and non-volatile waste, can be disposed of as solid waste, for which the environmental regulations are different. It is also much less messy to dispose of a solid than a liquid.

In an alternative embodiment of the invention, the liquid can be absorbed with an absorptive medium, with the user thereafter disposing of the reservoir, absorbent, and absorbed liquid as one. In this method, some evaporation may take place, but less completely than in the first method. The advantage of this method is principally that the waste is converted from liquid to solid for ease of disposal. In a further alternative embodiment, the liquid waste may be channeled to a reservoir containing a reactive ingredient that reacts with some of the components in the waste stream to create a solid or a gel. In this method too, the principal advantage is that the waste is converted to a solid.

3D printers, such as those disclosed in the previously mentioned patents and patent applications, the disclosures of which are incorporated hereby in their entirety, often use pogo pins (sprung electrical connectors) to make power, ground, and signal connections to the printheads. These pogo pins are used because they may last longer than the high pressure low force (HPLF) flex circuits that are often used to make connections to printheads used in paper printers. These pogo pins are usually soldered to a through hole PC board. A spacer, made of insulating material, is placed between the PC board and the tip of the pin to provide support against bending or buckling of the pin.

This arrangement has several problems. The arrangement provides a number of paths for contamination to enter the pin and cause binding and sticking. The pins are hollow, so contaminants, which are plentiful and omnipresent in 3D printing, can enter from the back side of the PC board through the hollow core of the pin. Contaminants can also lodge in the space between the pin and the spacer and either enter the pin or simply increase friction between the pin and the spacer enough to cause sticking. The further problem is that the through hole design puts a lower limit on the pitch between pins that is substantially higher than the limit for an HPLF design. This may make it harder to use off-the-shelf printheads that have connector spacing based on HPLF connectors. The through hole requires a hole that is a slip-fit for the pogo pin plus plating. This area is, therefore, not available for other pogo pins or to signal line routing on any layer of the PC board.

Figure 9A:
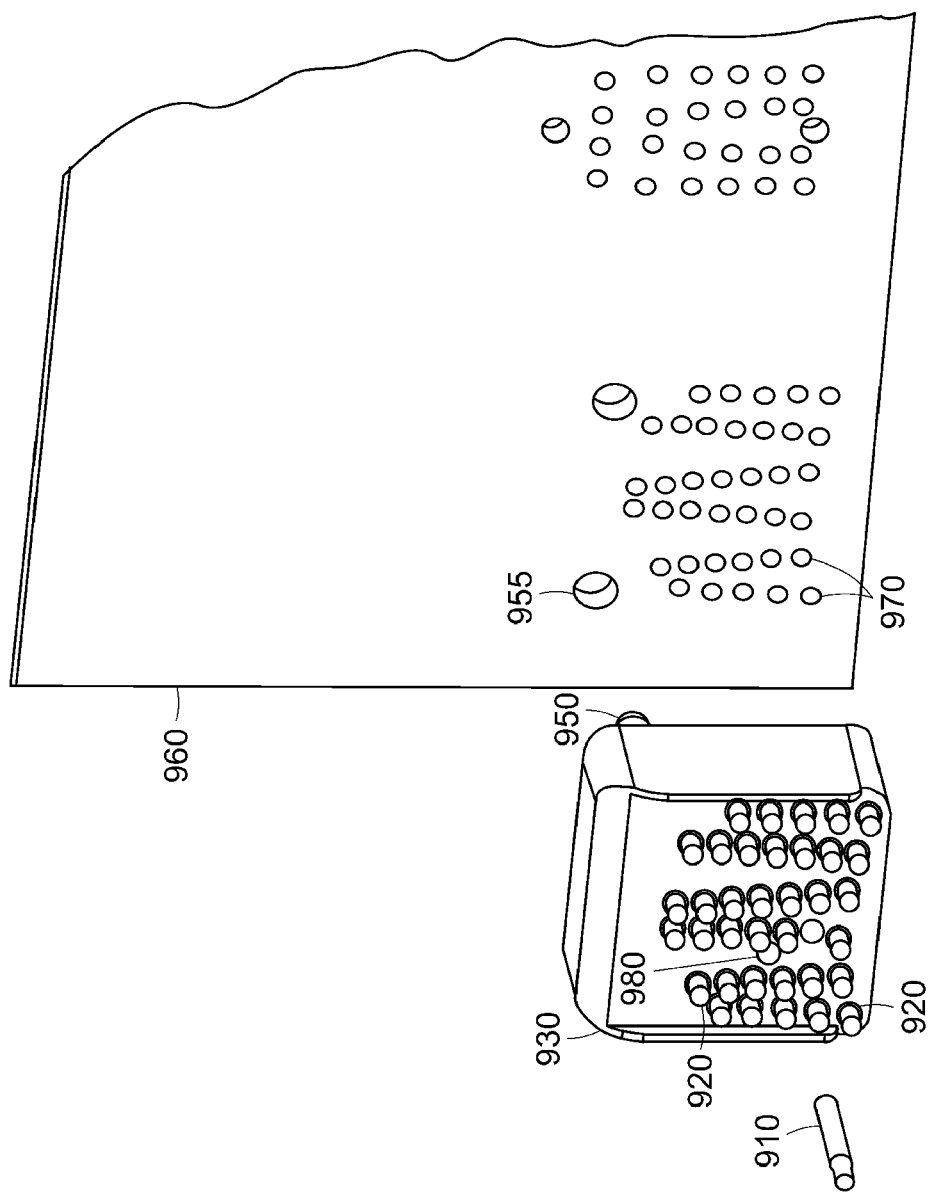
FIG. 9A is an exploded perspective view of a pogo PC board for a 3D printer, in accordance with one embodiment of the invention.
Figure 9B:
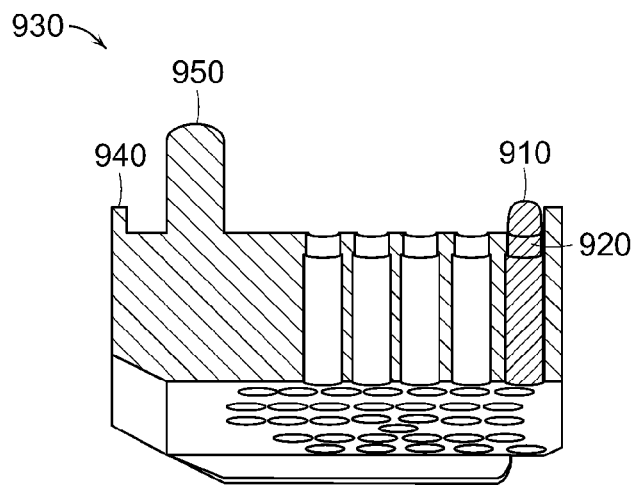
FIG. 9B is a schematic sectional side view of the pogo base of FIG. 9A, in accordance with one embodiment of the invention.
Figure 9C:
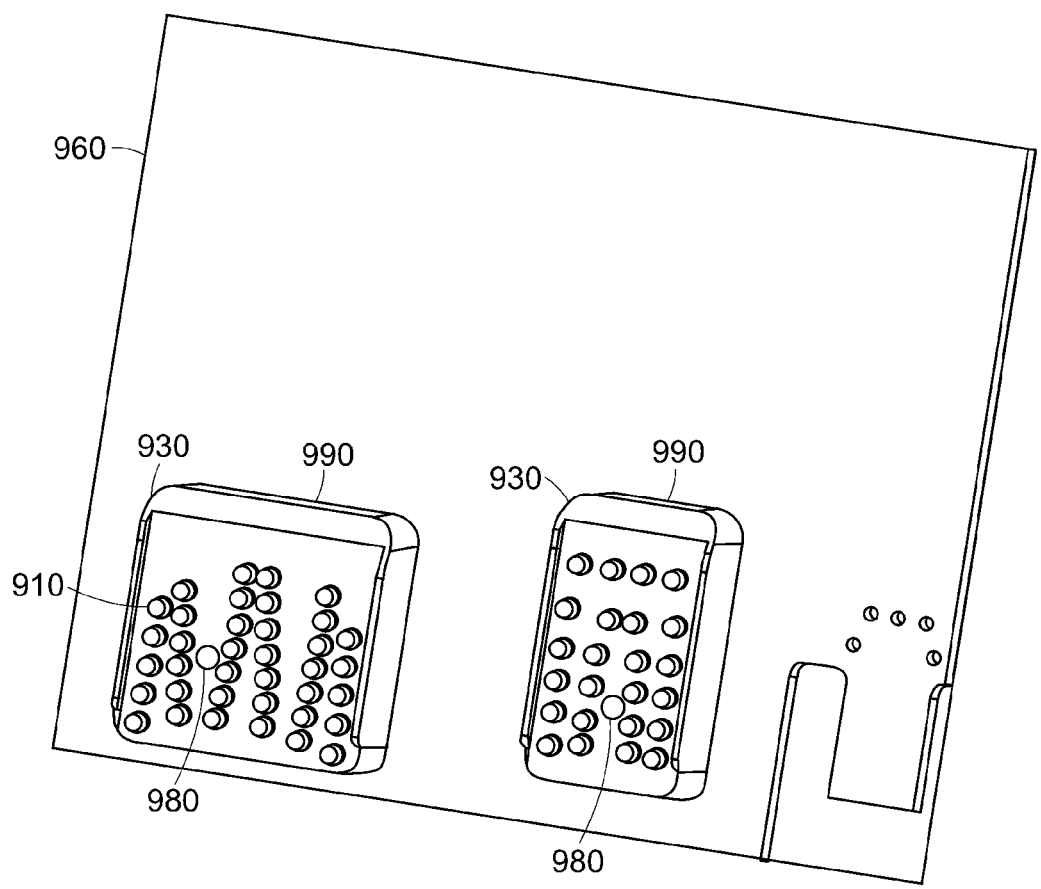
FIG. 9C is a schematic perspective view of the pogo PC board of FIG. 9A in an assembled configuration.

One embodiment of the invention includes a method for mounting the pins in the spacer so that the pins can be surface mounted to a PC board. In this embodiment, pins are placed in stepped holes in the spacer, and then pressed in. An example of this embodiment is shown in FIGS. 9A to 9C. In this embodiment, pogo pins 910 are pressed into stepped holes 920 in a spacer 930 until they extend slightly beyond the lower wall 940 of the spacer. Locating pins 950 in the spacer 930 are inserted into corresponding holes 955 in the PC board 960. The stepped holes 920 have a wider diameter at the outer surface of the spacer 930 (i.e. the surface away from the PC board 960) and a smaller diameter at the surface of the spacer 930 nearest the PC board 960. This positions the pogo pins 910 in proximity to solder pads 970 on the PC board 960 to which solder paste has been applied. The solder may be melted in a conventional surface mount oven, permanently affixing the pogo pins 910 to the PC board 960.

In addition, a means of sealing the spacer to the PC board, and the pins to the spacer, is provided. Here, sealant, such as RTV (room temperature vulcanization) sealant, can then be injected into the space between the spacer and the PC board through a sealant hole 980. This sealant can flow between each of the pins and out through a sealant exit hole or gap 990 between the spacer 930 and the PC board 960. Alternatively, a gasket may be placed between the spacer 930 and the PC board 960. As a result, the sealant and the PC board 960 seal two of the contaminant paths that were present in previous designs. This can reduce the size of the electrical connections and allow for the use of off-the-shelf printheads that have connector spacing based on HPLF connectors.

As this method eliminates through holes for the pogo pins 910, which are larger than the pin diameter, and replaces them with solder pads 970, which are smaller, the minimum pitch of the pins is reduced. This allows tighter spacing of the pogo pins 910. As the solder pad is on only one layer of the PC board 960, it is possible to route signal lines, or power lines, closer to the pin center line on other layers than would be possible in a through-hole design.

The specific configurations of the spacers 930 and PC board 960 will vary to suit a particular application. In one embodiment, the spacer 930 can be manufactured from a liquid crystal polymer, such as, for example, Vectra® A130 available from Ticona. The PC board 960 can be customized for the specific application with a FR4 blank from JJ Orly, Inc. The pogo pin 910 can be a battery interconnect probe #BIP-1 as available from Everett Charles Technologies. The sealant can be a silicone elastomer, such as RTV coating #3140 available from the Dow Corning Company.

In addition to the materials described hereinabove, the various components can also be manufactured from other suitable polymeric material or combination of polymeric materials, either with or without reinforcement. Suitable materials include: polyurethanes, such as TPU; EVA; thermoplastic polyether block amides, such as the Pebax® brand sold by Elf Atochem; thermoplastic polyester elastomers, such as the Hytrel® brand sold by DuPont; polyamides, such as nylon 12, which may include 10 to 30 percent or more glass fiber reinforcement; silicones; polyethylenes; and equivalent materials. Reinforcement, if used, may be by inclusion of glass or carbon graphite fibers or para-aramid fibers, such as the Kevlar® brand sold by DuPont, or other similar method. Also, the polymeric materials may be used in combination with other materials, for example rubber or metal alloys. Additional materials include carbon steel, stainless steel, and aluminum. Other suitable materials will be apparent to those skilled in the art.

Generally, the shapes and sizes of the components described herein will vary to suit their particular application, for example, printer size, output, and materials used. The various assemblies can include suitable motors, drive transmission components, sensors, and controllers to coordinate the operation thereof, as will be apparent to those skilled in the art. System diagnostics, sensor-based fault detection, feedback control, and other troubleshooting tools consistent with robust production manufacturing systems may also be advantageously employed to ensure high quality process yields and minimal downtime.

The polymer components can be manufactured by, for example, injection molding or extrusion. Extrusion processes may be used to provide a uniform shape. Insert molding can then be used to provide the desired geometry of the open spaces, or the open spaces could be created in the desired locations by a subsequent machining operation. Other manufacturing techniques include melting or bonding portions together. The metal components can be manufactured by conventional machining and forming processes, as known to those of skill in the art.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A build chamber for use in a three-dimensional printer and adapted for receiving powder for producing three-dimensional objects, the chamber comprising:
    a build surface for receiving the powder, the build surface comprising:
        a first plate defining a plurality of spaced holes having a pitch; and
        a second plate defining a plurality of openings spaced apart and offset from the plurality of holes in the first plate, the second plate disposed below and spaced from the first plate, and
    a mechanism for vibrating the build surface, wherein the pitch corresponds to the space between proximate edges of adjacent holes; and a vacuum source to create a vacuum beneath the build surface.

2. A build chamber for use in a three-dimensional printer and adapted for receiving powder for producing three-dimensional objects, the chamber comprising:
    a build surface for receiving, the powder, the build surface comprising:
        a first: plate defining a plurality of spaced holes having a pitch; and
        a second plate defining a plurality of openings spaced apart and offset from the plurality of holes in the first plate, the second plate disposed below and spaced from the first plate,
    wherein the pitch corresponds to the space between proximate edges of adjacent holes, and the space between the plates is variable.

3. A method of controlling the flow of unbound powder in a build chamber, the method comprising the steps of:
    providing a build surface for receiving the powder, the build surface comprising:
        a first plate defining a plurality of spaced apart holes having a pitch; and
        a second plate defining a plurality of openings spaced apart and offset from the plurality of holes in the first plate, the second plate disposed below and spaced from the first plate, wherein the pitch corresponds to the space between proximate edges of adjacent holes;
    providing a vacuum source, below the build surface; and
    activating the vacuum source to create a vacuum beneath the build surface to cause the powder to flow through the first and second plates.

4. The method of claim 3 further comprising the step of maintaining ambient pressure within the build chamber to prevent flow of powder through the build surface.

5. The method of claim 3, wherein the build chamber comprises a plenum disposed below the build surface for coupling the vacuum source to the build chamber.

6. The method of claim 5, wherein the plenum comprises an outlet for removing unbound powder from the build chamber when the vacuum source is activated.

7. The method of claim 3, wherein the build chamber comprises:
   at least one wall at least partially circumscribing the build surface and at least partially defining the chamber; and
   a piston disposed below the build surface and adapted to the build chamber to move the build surface vertically relative to the at least one wall.

8. The method of claim 3 further comprising the step of vibrating the build surface to promote flow of unbound powder.

9. The method of claim 3 further comprising the step of varying the space between the first plate and the second plate to accommodate powders having different angles of repose.

10. The method of claim 3, wherein at least one of the first plate and the second plate are interchangeable with plates adapted for differing angles of repose.

11. The method of claim 3, wherein the plurality of openings of the second plate are offset from the plurality of holes in the first plate by approximately 50% of the pitch.

12. The method of claim 3, wherein the pitch is at least equal to 2(space between the plates)(cotangent of an angle of repose of the powder)+(diameter of holes).

13. The method of claim 3, wherein the pitch is approximately equal to 2(space between the plates)(cotangent of an angle of repose of the powder)+(diameter of holes).

* * * * *